United States Patent
Richardson et al.

(10) Patent No.: US 6,917,631 B2
(45) Date of Patent: Jul. 12, 2005

(54) PULSED LIGHT SOURCES

(75) Inventors: David J Richardson, Southampton (GB); Lars Johan Albinsson Nilsson, Southampton (GB); Laurent Lefort, Limoges (FR); Jonathan Hugh Vaughan Price, Cardiff (GB); Andrew Malinowski, Southampton (GB); Morten Ibsen, Southampton (GB)

(73) Assignee: University of Southampton, Highfield (GB)

( * ) Notice: Subject to any disclaimer, the term of this patent is extended or adjusted under 35 U.S.C. 154(b) by 255 days.

(21) Appl. No.: 10/146,219

(22) Filed: May 13, 2002

(65) Prior Publication Data

US 2003/0156605 A1 Aug. 21, 2003

(30) Foreign Application Priority Data

Feb. 18, 2002 (GB) ............................................. 0203798

(51) Int. Cl.⁷ .............................................. H01S 3/30
(52) U.S. Cl. ............................... 372/5; 372/25; 372/30
(58) Field of Search ........................... 372/5, 6, 10, 18; 359/25, 29.01, 30, 333

(56) References Cited

U.S. PATENT DOCUMENTS

| | | | | |
|---|---|---|---|---|
| 5,014,277 A | * | 5/1991 | Van Driel et al. ............. | 372/18 |
| 5,128,601 A | * | 7/1992 | Orbach et al. ................. | 372/30 |
| 5,450,427 A | * | 9/1995 | Fermann et al. .............. | 372/10 |
| 5,546,415 A | | 8/1996 | Delfyett et al. ............... | 372/25 |
| 5,696,782 A | | 12/1997 | Harter et al. | |
| 5,818,630 A | | 10/1998 | Fermann et al. | |
| H1926 H | * | 12/2000 | Carruthers et al. ............. | 372/6 |
| 6,208,458 B1 | * | 3/2001 | Galvanauskas et al. ..... | 359/345 |
| 6,347,007 B1 | * | 2/2002 | Grubb et al. ........... | 359/337.21 |
| 6,373,565 B1 | * | 4/2002 | Kafka et al. ............. | 356/237.4 |
| 6,590,910 B2 | * | 7/2003 | Lin ............................. | 372/18 |
| 6,728,273 B2 | * | 4/2004 | Perry ......................... | 372/18 |
| 6,760,356 B2 | * | 7/2004 | Erbert et al. .................. | 372/93 |
| 2002/0168161 A1 | * | 11/2002 | Price et al. ................. | 385/123 |
| 2004/0263950 A1 | * | 12/2004 | Fermann et al. ............ | 359/333 |

FOREIGN PATENT DOCUMENTS

EP 1 118 904 A1 7/2001

OTHER PUBLICATIONS

U.S. Appl. No. 10/120,965, filed Apr. 10, 1002, J. H. V. Price, Sources of, and Methods for Generating, Optical Pulses.

Cautaerts, V., et al., "Stretched pulse Yb3+:silica fiber laser" Optics Letters, 1997, 22(5): p. 316–318.

(Continued)

Primary Examiner—Mingun Oh Harvey
Assistant Examiner—Cornelius H. Jackson
(74) Attorney, Agent, or Firm—Stallman & Pollock LLP

(57) ABSTRACT

A source of pulses of coherent radiation at a wavelength of approximately 1 μm, comprises a pump source for producing pump light, a laser cavity comprising an $Yb^{3+}$-doped gain medium arranged to receive the pump light, the laser cavity being modelocked to generate laser pulses at a defined repetition rate; a pulse detector arranged to generate a pulse selection signal indicative of the repetition rate; a pulse selector arranged to reduce the repetition rate of the laser pulses responsive to the pulse selection signal from the pulse detector by passing only selected ones of the laser pulses; and at least one optical amplifier for amplifying the laser pulses of reduced repetition rate. The at least one optical amplifier can be configured for chirped or parabolic pulse amplification.

29 Claims, 17 Drawing Sheets

OTHER PUBLICATIONS

Galvanauskas, A., et al., "Millijoule femtosecond fiber CPA system" Paper PD3–1, Conference on Lasers and Electro–Optics Technical Digest 2000, Optical Society of America.

Fermann, M.E., et al., "Wavelength–tunable soliton generation in the 1400–1600 nm region using an Yb fiber laser" Paper TU12–1, Conference on Lasers and Electro–Optics Technical Digest 2000, Optical Society of America.

Paschotta, R., et al., "Ytterbium–doped fiber amplifiers" IEEE Journal of Quantum Electronics, 1997, 33(7): p. 1049–1056.

Pask, H.M., et al., "Ytterbium–Doped Silica Fiber Lasers—Versatile Sources for the 1–1.2 μm Region" IEEE Journal of Selected Topics in Quantum Electronics, 1995, 1(1): p. 2–13.

Desthieux, B., R.I. Laming, and D.N. Payne, "111 kW (0.5 mJ) Pulse Amplification at 1.5–μm Using a Gated Cascade of Three Erbium–Doped Fiber Amplifiers" Applied Physics Letters, 1993, 63(5): p. 586–588.

Fermann, M.E., et al., "Ultrawide tunable Er soliton fiber laser amplified in Yb–doped fiber" Optics Letters, 1999, 24(20): p. 1428–2430.

Ober, M.H., M. Hofer, and M.E. Fermann, "42–fs Pulse Generation from a Mode–Locked Fiber Laser Started with a Moving Mirror" Optics Letters, 1993, 18(5): p. 367–369.

Keller, U., et al., "Semiconductor saturable absorber mirrors (SESAM's) for femtosecond to nanosecond pulse generation in solid–state lasers" IEEE Journal of Selected Topics in Quantum Electronics, 1996, 2(3): p. 435–453.

Monro, T.M., et al., "Holey optical fibers: An efficient modal model" Journal of Lightwave Technology, 1999, 17(6): p. 1093–1102.

Hönninger, C., et al., "Efficient and tunable diode–pumped femtosecond Yb:glass lasers" Optics Letters, 1998, 23(2): p. 126–128.

Lee, J., et al., "Enhancement of power conversion efficiency for an L–band EDFA with a secondary pumping effect in the unpumped EDF section" IEEE Photonics Technology Letters, 1999, 11(1): p. 42–44.

Broderick, N.G.R., et al., "Power scaling in passively mode–locked large–mode area fiber lasers" IEEE Photonics Technology Letters, 1998, 10(12): p. 1718–1720.

Lemoff B.E. and C.P.J. Barty, "Quintic–phase–limited, spatially uniform expansion and recompression of ultrashort optical pulses" Optics Letters, 1993, 18(19): p. 1651–1653.

Martinez O.E., "Design of high power ultrashort pulse amplifiers by expansion and recompression" IEEE Journal of Quantum Electronics, 1987, QE–23(8): p. 1385–1387.

Boderick, N.G.R. et al., "High–power chirped–pulse all–fiber amplification system based on large–mode–area fiber gratings" Optics Letters, 1999, 24(8): p. 566–568.

Fermann, M.E., et al., "Self–similar propagation and amplification of parabolic pulses in optical fibers" Physical Review Letters, 2000, 84(26): p. 6010–6013.

N. Nishizawa and T. Goto, "Compact system of wavelength– tunable femtosecond soliton pulse generation using optical fibers," IEEE Photonics Technology Letters 11(3), 325–327 (1999).

M. E. Fermann, A. Galvanauskas, M. L. Stock, K. K. Wong, D. Harter and L. Goldberg, "Ultrawide tunable Er soliton fiber laser amplified in Yb–doped fiber," Optics Letters 24(20), 1428–1430 (1999).

X. Liu, C. Xu, W. H. Knox, J. K. Chandalia, B. J. Eggleton, S. G. Kosinski and R. S. Windeler, "Soliton self–frequency shift in a short tapered air–silica microstructure fiber," Optics Letters 26(6), 358–360 (2001).

J. K. Ranka, R. S. Windeler and A. J. Stentz, "Visible continuum generation in air–silica microstructure optical fibers with anomalous dispersion at 800 nm," Optics Letters 25(1), 25–27 (2000).

A. Galvanauskas et al., "Millijoule femtosecond fiber CPA system," Advanced Solid–State Lasers, Proceedings, vol. 50, OSA Trends in Optics and Photonics, C. Marshall, ed. Washington: *Optical Soc America* (2001), pp. 679–681.

A. Galvanauskas et al., "13–W average power ultrafast fiber laser," *Tech. Dig. Conf. Lasers and Electro–Optics, Optical Society of America,* Postdeadline paper PD3, Baltimore, MD, 2000, pp. 663–664.

A. Galvanauskas et al., "Millijoule femtosecond all–fiber system," *Conference on Lasers and Electro–Optics (CLEO–2001).* Technical Digest vol. 56, OSA Trends in Optics and Photonics, Washington, D.C., 2001, pp. 1–3.

J.H.V. Price et al., "A practical, low–noise, stretched pulse $Yb^{3+}$ doped fiber laser," *Lasers and Electro–Optics, 2001, CLEO '01, Technical Digest,* 2001, pp. 219–220.

* cited by examiner

PULSED LIGHT SOURCES

CROSS-REFERENCE TO RELATED APPLICATIONS

This application claims benefit to United Kingdom National Application No. 0203798.4 filed in English on Feb. 18, 2002. The disclosure of this patent application is incorporated herein by reference.

This application is related to U.S. patent application Ser. No. 10/120,965, filed on Apr. 10, 2002, and entitled "Sources of, and Methods for Generating, Optical Pulses."

BACKGROUND OF THE INVENTION

1. Field of the Invention

The invention relates to pulsed light sources, more especially, but not exclusively, to light sources that comprise optical fiber amplifiers for chirped pulse amplification.

2. Related Art

There is much demand for sources of pulses of light having both ultrashort durations (picosecond and femtosecond durations) and high energies. Many applications of ultrashort optical pulses require the peak powers, and hence the energies, of the pulses to be sufficient to excite a wide variety of non-linear optical processes. These include two-photon absorption, non-linear frequency generation in optical parametric oscillators, and super continuum generation in non-linear small core optical fibers. For materials processing, there is a rapidly emerging demand for femtosecond and picosecond pulses at ultraviolet wavelengths (which can be generated by frequency-quadrupling processes). It is observed that unlike ultraviolet pulses having nanosecond durations (produced by Q-switching processes), ultrashort pulses can ablate material before heat has time to diffuse away from the exposed region. This results in improved resolution and reduced collateral damage such as micro-cracking. Furthermore, given sufficiently high beam quality and amplitude stability, it is also possible to detect (by two-photon absorption) and ablate (in materials processing) features of a dimension less than the wavelength of the light, by arranging that only in the bright center of the beam is the intensity high enough to excite the required non-linear processes. Meeting the requirements for this wide range of existing and emerging applications therefore requires pulses at a variety of wavelengths with preferably sub-picosecond duration and megawatt peak power, so that the pulse energies are in the microjoule region.

Silica fiber doped with ytterbium ions ($Yb^{3+}$) is a useful medium for the generation and amplification of ultrashort pulses at around 1 micron, and more specifically at 1.06±0.05 μm. $Yb^{3+}$-doped fiber has a broad gain bandwidth, high optical conversion efficiency and a large saturation fluence [1]. Several ultrashort pulse systems using $Yb^{3+}$-doped fiber have been reported. Examples include:

- a laser having an Yb3+-doped fiber gain medium in a ring-shaped cavity and pumped with a Ti-sapphire laser [1]. The repetition rate of the pulses generated is ~50 MHz;
- a system including a laser having an Er-fiber gain medium producing 1.56 μm picosecond pulses that are successively put through a fiber Raman shifter, a periodically poled lithium niobate (PPLN) second harmonic generator and a Yb3+-doped fiber pre-amplifier to convert the pulses to a wavelength of 1.055 μm [2], at a repetition rate of 50 MHz; and
- a laser using a Yb3+-doped fiber gain medium to generate femtosecond pulses at a repetition rate of 50 MHz, in which pump light is coupled into the cladding of the fiber [3].

$Yb^3$+-doped fiber lasers will generally have too low an output energy for many of the non-linear applications detailed above. Laser oscillators tend to be unstable when operated so as to produce suitably high output powers directly. Consequently, optical amplification, also by $Yb^{3+}$-doped fiber, has been proposed for the amplification of pulses having wavelengths around 1 μm [4,5].

The use of fiber amplifiers as amplification stages for pulsed laser sources presents its own problems, principally mode distortion, non-linear distortion and gain saturation.

Mode distortion arises if multimode fibers are used to increase energy storage [6]. Single mode fibers have good mode characteristics, but cannot provide such high energy storage. An amplifier using a multimode fiber in which only the fundamental propagation mode is excited has been proposed [7] to combine high energy storage and good mode characteristics.

Non-linear distortion in the amplifier gain medium arises at high peak pulse powers which result when higher overall energies are desired. A technique for reducing non-linear distortion is chirped pulse amplification (CPA) in which pulses are stretched (or chirped) prior to amplification and then compressed (or unchirped) after amplification. Pulse stretching increases pulse durations during amplification, thereby lowering peak pulse powers below the threshold at which non-linear effects are induced in the gain medium of the amplifier.

Gain saturation arises at high pulse repetition rates, such as the 50MHz repetition rates of the systems described above, where the average power of the pulses becomes so high that the gain of the amplifier saturates. This reduces the pulse energies which can be achieved by the amplification process.

There is thus the need for a high-energy pulsed $Yb^{3+}$laser source at a wavelength of around 1 micron that offers a good combination of low mode distortion and low non-linear distortion while avoiding gain saturation.

SUMMARY OF THE INVENTION

According to a first aspect of the invention there is provided a source of pulses of coherent radiation at a wavelength of approximately 1 μm, comprising: a pump source for producing pump light, a laser cavity comprising an $Yb^{3+}$ doped gain medium arranged to receive the pump light, the laser cavity being modelocked to generate laser pulses at a defined repetition rate, a pulse detector arranged to generate a pulse selection signal indicative of the repetition rate, a pulse selector arranged to reduce the repetition rate of the laser pulses responsive to the pulse selection signal from the pulse detector by passing only selected ones of the laser pulses, and at least one optical amplifier for amplifying the laser pulses of reduced repetition rate.

The provision of a pulse selector after the $Yb^{3+}$ laser reduces the pulse repetition rate from the laser, thereby allowing gain saturation problems to be avoided in a simple manner that does not contribute either to mode distortion or non-linear distortion. Optical amplification may be provided in one or more stages after the $Yb^{3+}$ laser using chirped or parabolic pulse amplification to deliver at high energy a good quality pulse train at 1.05 μm.

The pulse selector may comprise a lithium niobate integrated optical intensity modulator including a Mach-Zehnder inteferometer. A pulse selector of this type can have an extinction ratio in excess of 40 dB, and hence provides improved pulse selection compared with other types of selector such as a Pockels cell.

The $Yb^{3+}$-doped gain medium may comprise a single mode optical fiber having a core, the pump light being coupled into the core.

Preferably, the laser cavity has a Fabry-Perot design. This design of cavity allows a simple and compact cavity configuration.

Modelocking of the laser cavity can be achieved by non-linear polarization rotation switching, using a semiconductor saturable absorber mirror operable to initiate modelocking, and a polarization selecting arrangement to polarize the light pulses and maintain the polarization while the light pulses are inside the cavity. A semiconductor saturable absorber mirror gives reliable self-start modelocking.

The at least one optical amplifier may be contained in an amplification system which is operable to achieve chirped pulse amplification, the system comprising a pulse stretcher for increasing the duration of the pulses before passing them to the at least one optical amplifier for amplification and a pulse compressor for decreasing the duration of the amplified pulses. Chirped pulse amplification allows greater pulse energies to be achieved while avoiding nonlinear distortion. The pulse stretcher may comprise a chirped fiber Bragg grating, and the pulse compressor may comprise a pair of diffraction gratings. A chirped fiber Bragg grating is highly dispersive, so that adequate pulse stretching can be achieved with a grating of only a few centimeters in length. A diffraction grating pair gives the required pulse compression without distorting the amplified pulses with nonlinear effects.

Chirped pulse amplification can give very high pulse energies, up to about 1 mJ, but does require both pulse stretching and compression. If pulses of somewhat lower energy, for example between 1 and 1 $\mu$J, are satisfactory for a particular application, the alternative, and simpler, technique of parabolic pulse amplification can be used instead.

Therefore, in an alternative embodiment, the amplification system is operable to achieve parabolic pulse amplification, and comprises a pulse compressor which decreases the duration of the pulses after the pulses have been amplified by the at least one optical amplifier. The pulse compressor may comprise a pair of diffraction gratings.

The at least one optical amplifier may comprise an amplifier pump source for producing amplifier pump light, and an amplification medium comprising an optical fiber having a cladding and a core, the amplification medium being arranged to receive the amplifier pump light and the laser pulses.

Advantageously, the amplification system may comprise at least two optical amplifiers arranged sequentially in a cascade. A cascade of amplifiers greatly increases the amplification beyond that achievable with a single amplifier.

Preferably, the amplification system further comprises at least one time gating device that is responsive to the pulse selection signal and arranged to allow radiation to pass from one optical amplifier to another in synchronicity with the pulse selection signal. Amplified spontaneous emission (ASE) arises from the amplifiers, and this can saturate the gain of the amplification system. One or more time gating device can reduce the amount of ASE passed from one amplifier to another through the cascade to reduce the chance of gain saturation.

The cascade of optical amplifiers may comprise at least one pre-amplifier followed by at least one power amplifier. Preferably, the cascade of fiber amplifiers comprises a first pre-amplifier followed by a second pre-amplifier followed by a power amplifier.

Advantageously, the amplification media of the first pre-amplifier and the second pre-amplifier comprise $Yb^{3+}$-doped optical fiber $Yb^{3+}$-doping gives the optical fiber a high amplification gain at the same wavelength as that generated by the $Yb^{3+}$-doped gain medium of the laser cavity. Therefore, high amplification of the pulses generated by the laser cavity can be achieved.

The amplification media of the first pre-amplifier and the second pre-amplifier may be formed of respective sections of single mode optical fibers. Also, the amplification media of the first pre-amplifier and the second pre-amplifier are arranged to receive amplifier pump light into the cores of the optical fibers.

Preferably, each pre-amplifier further comprises a $Yb^{3+}$-doped indirectly pumped optical fiber coupled to the optical fiber of its amplification medium to absorb amplified spontaneous emission arising from the amplification medium, and arranged so that it does not receive amplifier pump light The absorption of ASE reduces the amount of such emission within the amplification system, and hence reduces the likelihood of the emission causing gain saturation.

The amplifier pump source of each pre-amplifier may comprise a master-oscillator-power-amplifier system (MOPA). Alternatively, the amplifier pump source may comprise a high-brightness single mode diode laser or an optical fiber-based laser.

Advantageously, the amplification medium of the power amplifier comprises a $Yb^{3+}$-doped large mode area optical fiber having a core and an inner cladding. Large mode area fiber has a large core area but supports a small number of modes. This means that pulses being amplified within it maintain a good beam quality while having a lower intra-fiber intensity. Therefore, high pulse energies can be supported without the pulses suffering non-linear distortion.

The large mode area fiber of the power amplifier is preferably arranged to receive amplifier pump light into its inner cladding, Preferably, the large mode area fiber is provided with an asymmetry in cross-section which acts to enhance coupling of the amplifier pump light received into the inner cladding from the inner cladding to the core. The asymmetry may arise from one or more generally flat sides provided on an outer surface of the inner cladding, or from the core being axially offset from a central longitudinal axis of the inner cladding.

The amplifier pump source of the power amplifier may comprise a diode laser.

After amplification in the power amplifier, the pulses preferably have an optical mode quality of substantially $M^2=1$.

Advantageously, the source of coherent radiation pulses further comprises an optical isolating device associated with the pump source and operable to protect the pump source from exposure to radiation generated in, or reflected from, other parts of the source of coherent radiation pulses. Optical isolation increases the stability of the source, as back-reflected light can disturb the mode-locking of the pump source.

Also, one or more of the at least one optical amplifiers may further comprise an optical isolating device associated with the amplifier pump source and operable to protect the amplifier pump source from exposure to radiation generated in, or reflected from, the remainder of the pump source. This arrangement helps to protect the amplifier pump source from possible damage and disturbance from back-reflected light, and improves the stability of the source.

Preferably each optical isolating device comprises one or more wavelength division multiplexers configured to reflect radiation having a wavelength of approximately 1μm. Multiplexers provide effective and low loss isolation which can be improved by cascading a number of multiplexers in a chain.

According to a second aspect of the invention there is provided a source of pulses of coherent radiation at a wavelength of approximately 1 μm, comprising a laser oscillator system operable to generate laser pulses at a defined repetition rate; and a cascade of sequentially arranged optical amplifiers arranged to receive and amplify the laser pulses, each optical amplifier comprising an amplifier pump source for producing amplifier pump light and an amplification medium comprising $Yb^{3+}$-doped optical fiber having a cladding and a core and arranged to receive the amplifier pump light and the laser pulses, the cascade comprising a first pre-amplifier followed by a second pre-amplifier followed by a power amplifier, the amplification media of the pre-amplifiers comprising single mode optical fibers arranged to receive amplifier pump light into the core of the optical fibers, each pre-amplifier further comprising a $Yb^{3+}$-doped indirectly pumped optical fiber coupled to the optical fiber of its amplification medium to absorb amplified spontaneous emission arising from the amplification medium, and arranged so that it does not receive amplifier pump light, and the amplification media of the power amplifier comprising a large mode area optical fiber having an inner cladding and arranged to receive amplifier pump light into the inner cladding.

The use of ytterbium as the amplification media in the amplifier cascade allows efficient amplification of pulses having wavelengths of approximately 1 μm, so that high power pulses suitable for many non-linear applications can be generated. The combination of two single mode fiber pre-amplifiers and a large mode area fiber power amplifier achieves high pulse powers together with a good optical mode quality. The cascade of amplifiers can be configured for either chirped or parabolic pulse amplification.

The amplifier pump source of each pre-amplifier may comprise a master-oscillator-power-amplifier system (MOPA), whereas the amplifier pump source of the power amplifier may comprise a diode laser. Alternatively, the amplifier pump source of either or both of the pre-amplifiers may comprise a high-brightness single mode diode laser or an optical fiber-based laser.

Each optical amplifier may further comprise an optical isolating device associated with the amplifier pump source and operable to protect the amplifier pump source from exposure to radiation generated in or reflected from other parts of the source of coherent radiation. Each optical isolating device may comprise one or more wavelength division multiplexers configured to reflect radiation having a wavelength of approximately 1 μm.

Advantageously, the large mode area optical fiber of the power amplifier is provided with an asymmetry in cross-section to enhance coupling of the amplifier pump light received into the inner cladding from the inner cladding to the core. The asymmetry may arise from one or more generally flat sides provided on an outer surface of the inner cladding, or alternatively from the core being axially offset from a central axis of the inner cladding.

Preferably, the pulses have an optical mode quality of substantially $M^2=1$ after amplification in the cascade.

The source of pulses of coherent radiation may further comprise a pulse detector arranged to generate a pulse selection signal indicative of the repetition rate, and at least one time gating device that is responsive to the pulse selection signal and arranged to allow radiation to pass from one optical amplifier to another in synchronicity with the pulse selection signal.

According to one embodiment, the source of pulses of coherent radiation further comprises a pulse stretcher which increases the duration of the pulses before passing them to the cascade of optical amplifiers, and a pulse compressor which decreases the duration of the amplified pulses, the cascade of optical amplifiers being arranged to achieve chirped pulse amplification. The pulse stretcher may comprise a chirped fiber Bragg grating, and the pulse compressor may comprise a pair of diffraction gratings.

According to a further embodiment, the source of pulses of coherent radiation further comprises a pulse compressor which decreases the duration of the amplified pulses, the cascade of optical amplifiers being arranged to achieve parabolic pulse amplification. The pulse compressor comprises a pair of diffraction gratings.

Embodiments of the first and second aspects of the invention, in which both the laser cavity or oscillator and the amplifier(s) are based on optical fibers, are particularly beneficial in that fiber-based optical systems offer a number of advantages including robustness and stability, simplicity, and ease of alignment.

According to a third aspect of the invention, there is provided a method of generating pulses of coherent radiation at a wavelength of approximately 1μm, comprising (1) generating pulses having a defined repetition rate from a modelocked laser oscillator having an $Yb^{3+}$-doped gain mediun (2) generating a pulse selection signal indicative of the pulse repetition rate, (3) activating a pulse selector with the pulse selection signal, (4) reducing the repetition rate of the pulses by passing the pulses through the activated pulse selector, and (5) amplifying the pulses by passing them through at least one optical amplifier.

The pulse selector may comprise a lithium niobate integrated optical intensity modulator including a Mach-Zehnder interferometer.

BRIEF DESCRIPTION OF THE VARIOUS VIEWS OF THE DRAWING

For a better understanding of the invention and to show how the same may be carried into effect reference is now made by way of example to the accompanying drawings in which.

Figure 1:
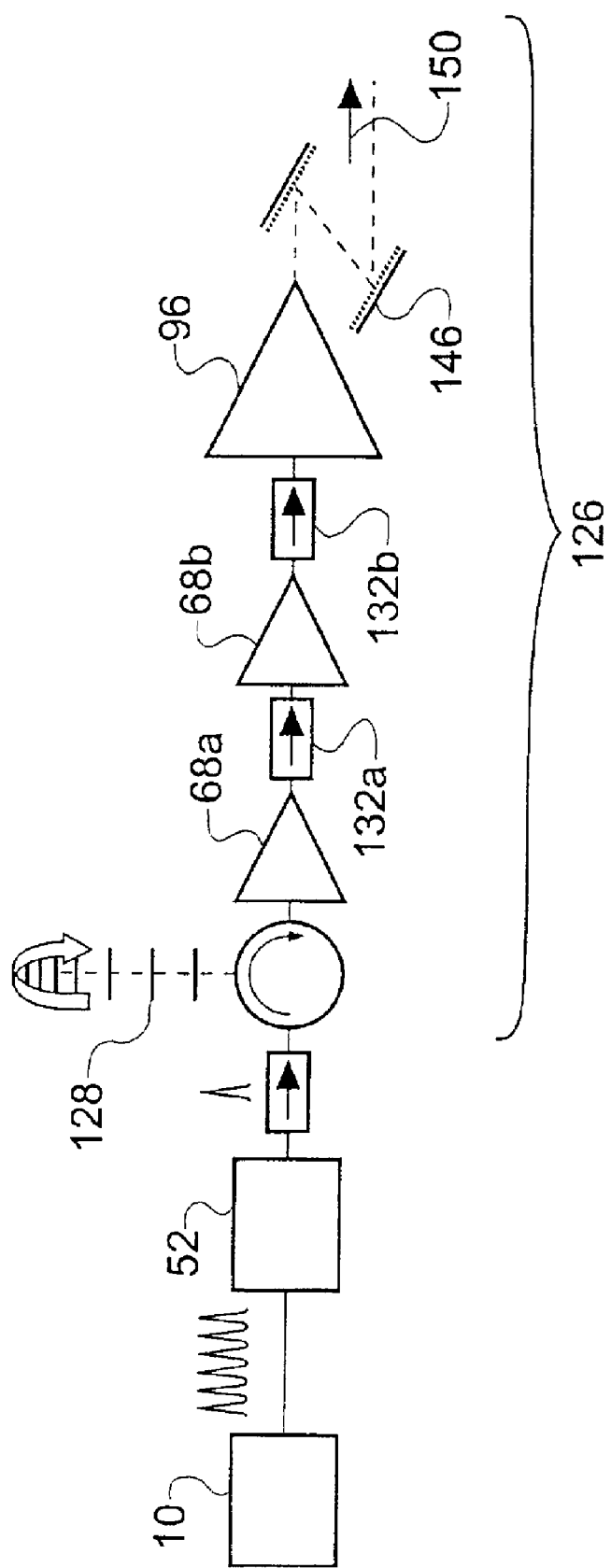
FIG. 1 shows a schematic block diagram of a first embodiment of a pulsed light source according to the present invention.
Figure 2:
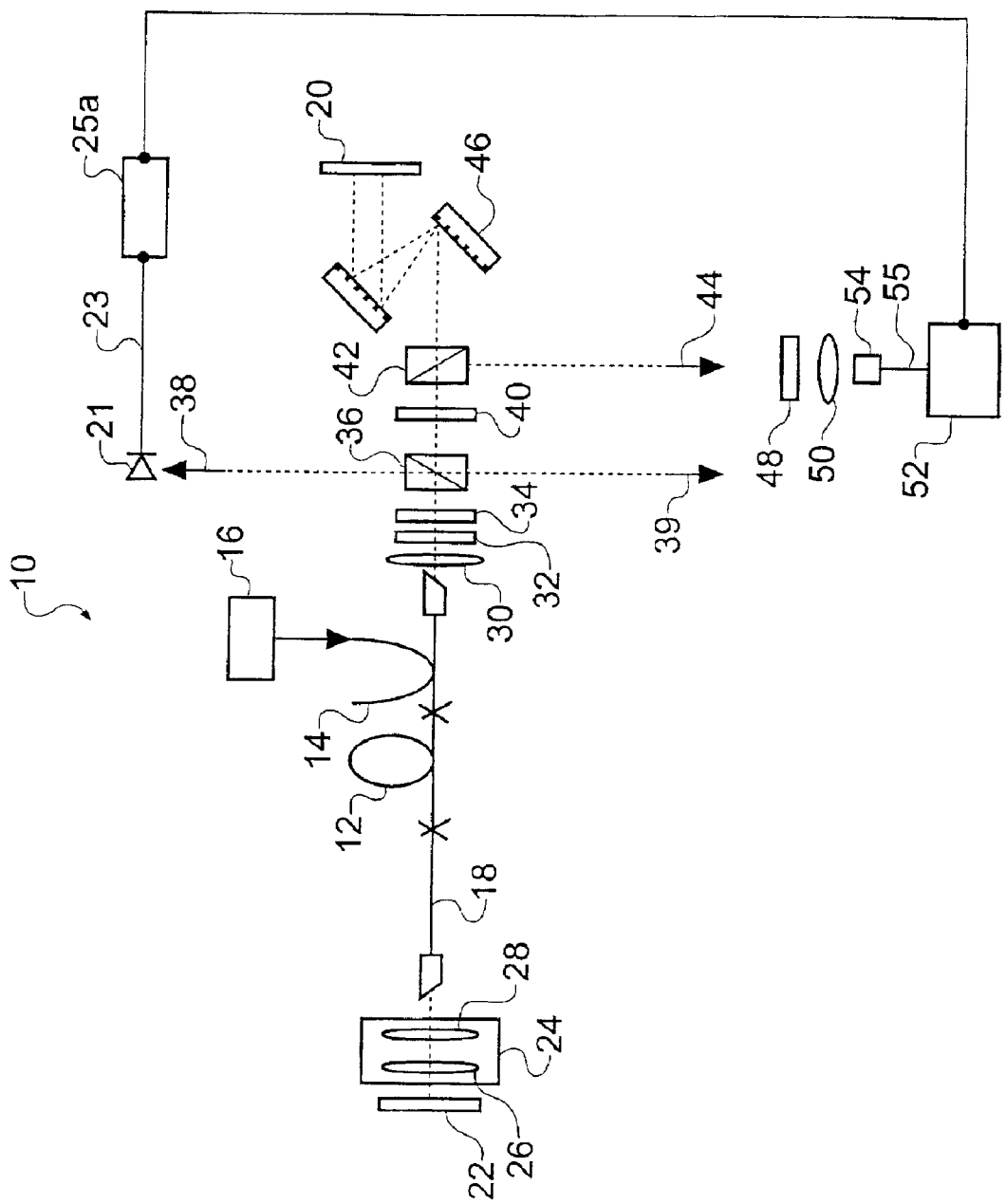
FIG. 2 shows a schematic diagram of a laser oscillator forming part of the light source of FIG. 1.
Figure 12A:
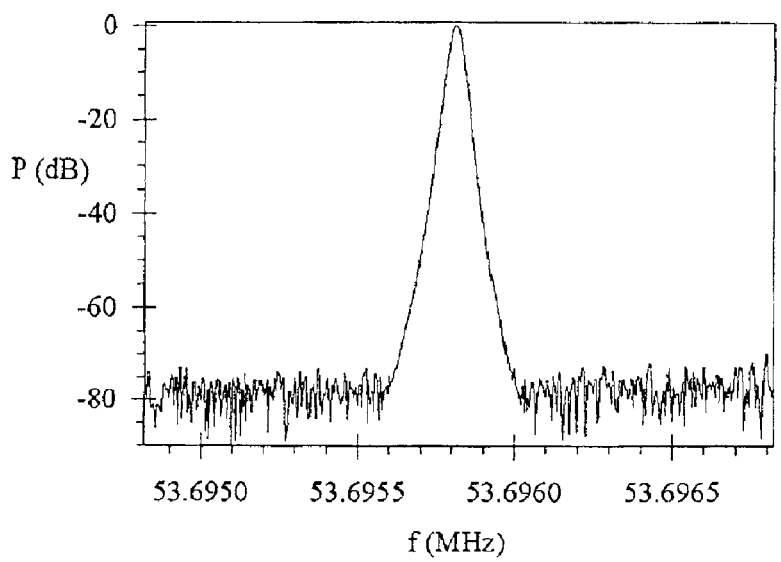
Figure 12B:
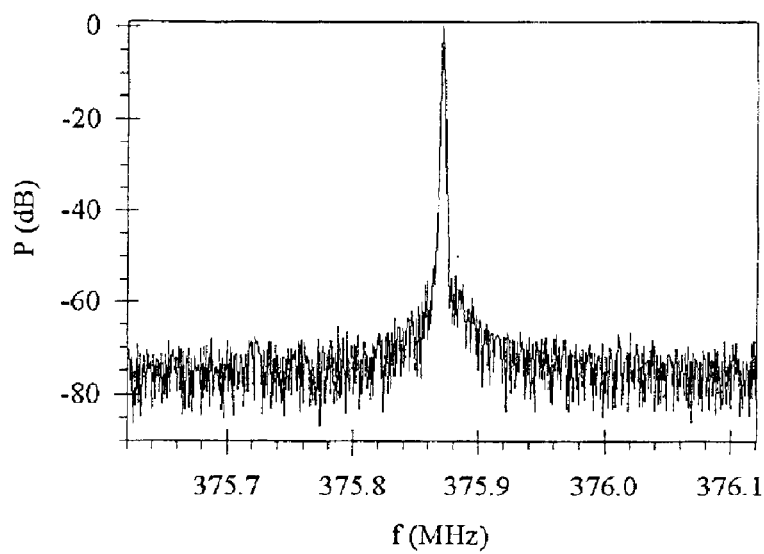
Figure 13:
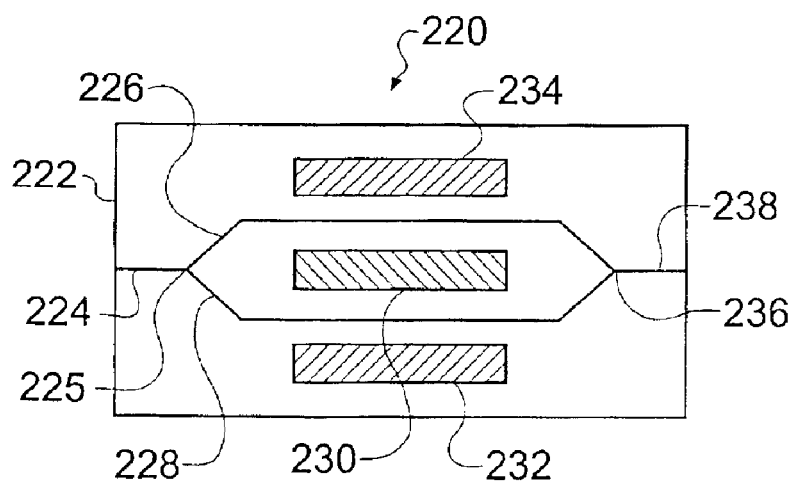
Figure 14:
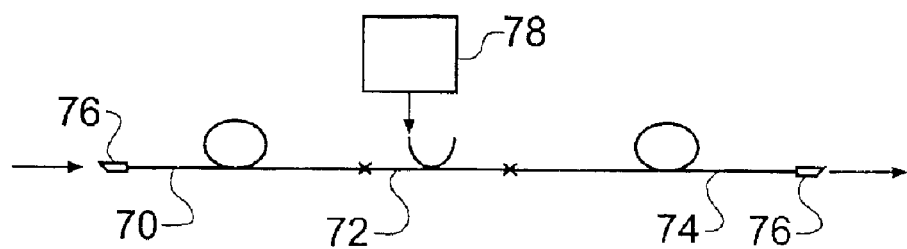

FIGS. 12(a) and 12(b) show measured radio frequency power spectra of light pulses generated by the laser oscillator of FIG. 2;

FIG. 13 shows a schematic diagram of a pulse selector forming part of the light source of FIG. 1;

FIG. 14 shows a schematic diagram of a fiber pre-amplifier forming part of the

Figure 15:
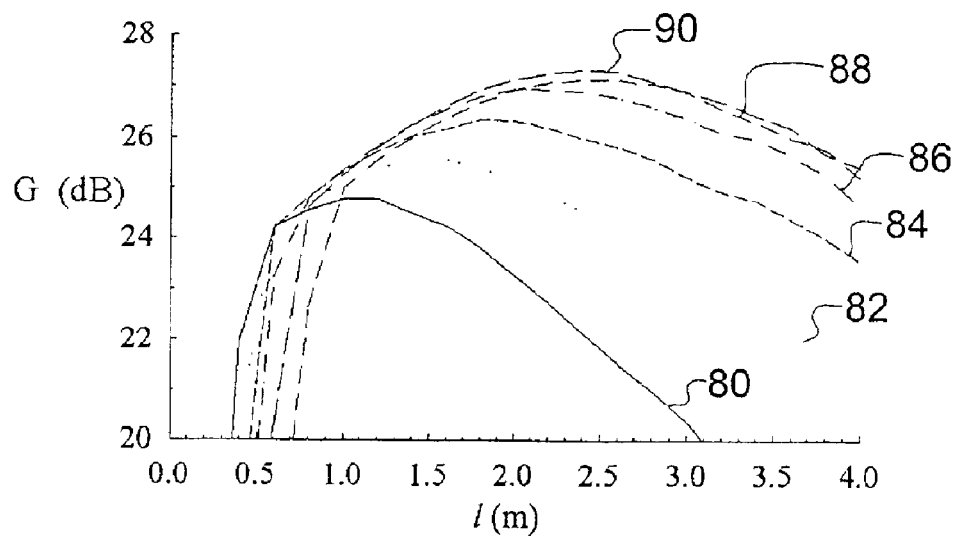
Figure 16:
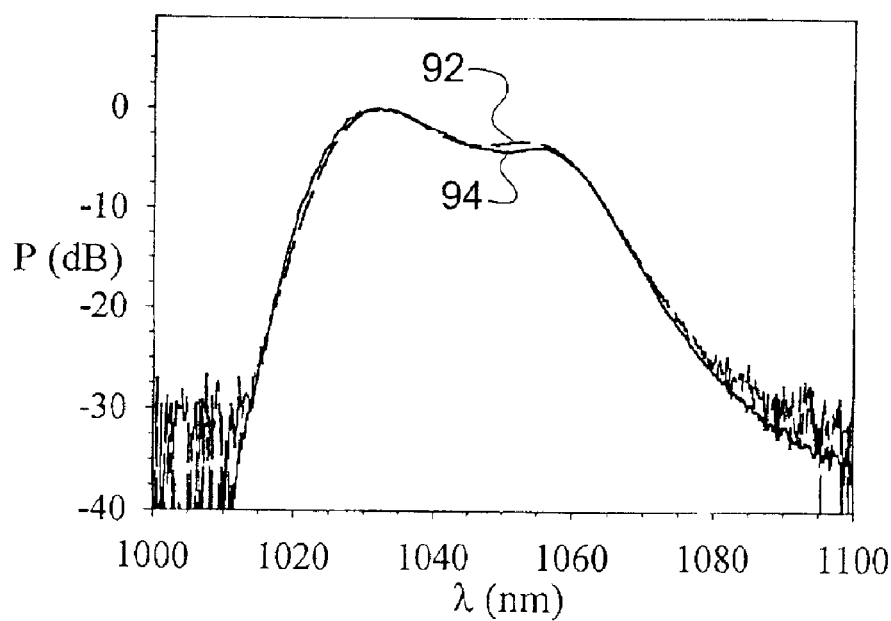
Figure 17:
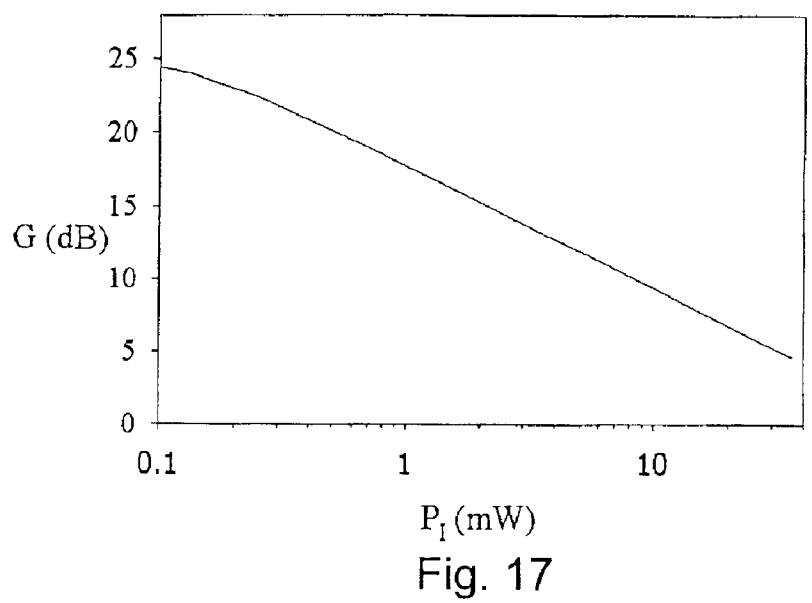
Figure 18:
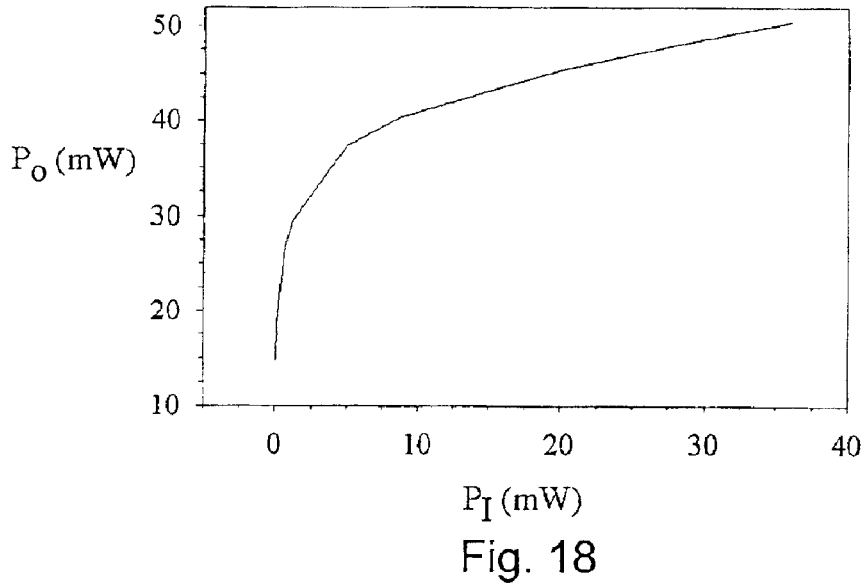
Figure 19:
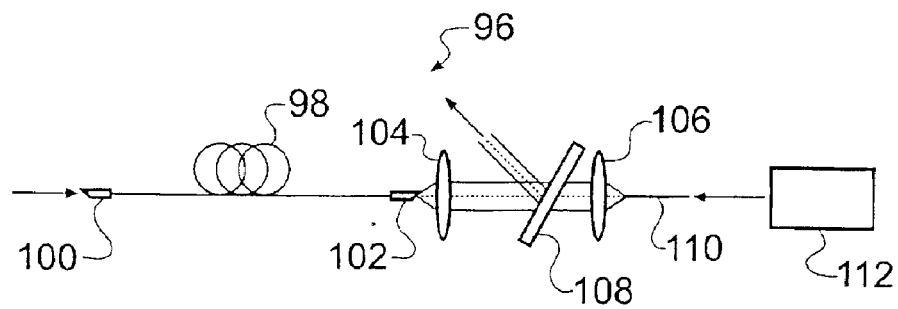
Figure 20:
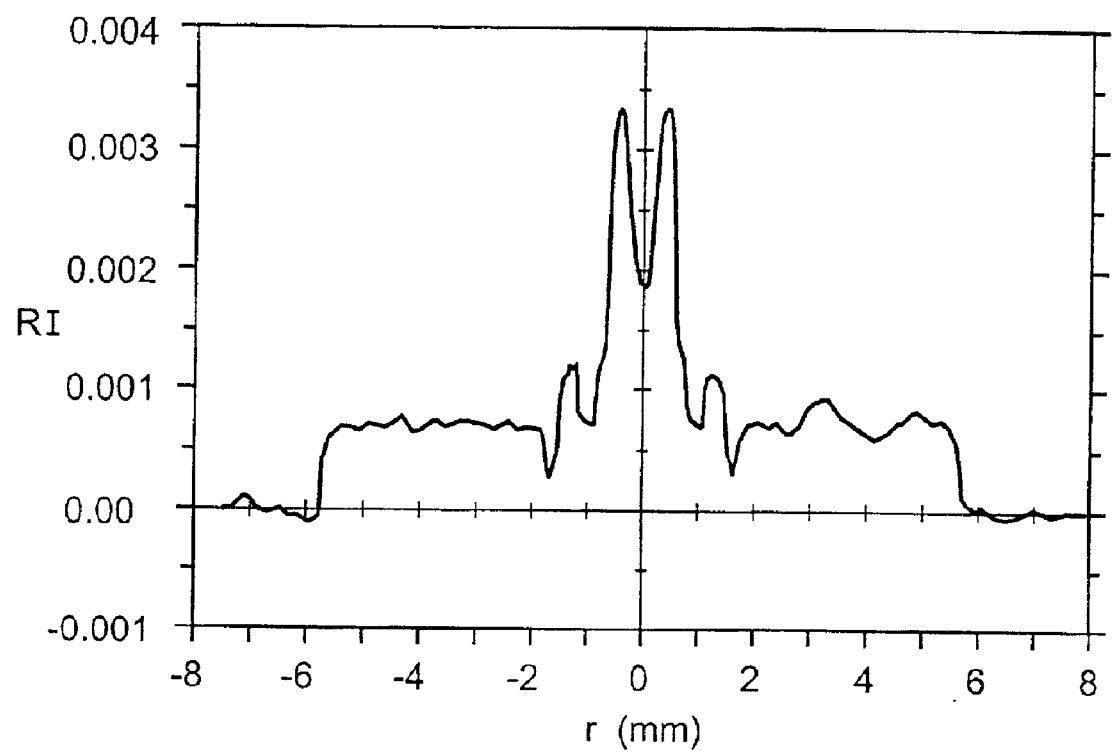
Figure 21:
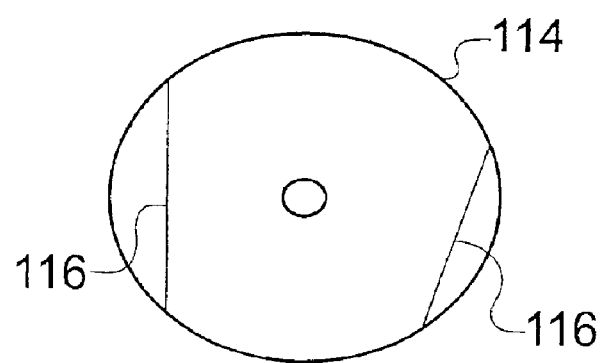
Figure 22:
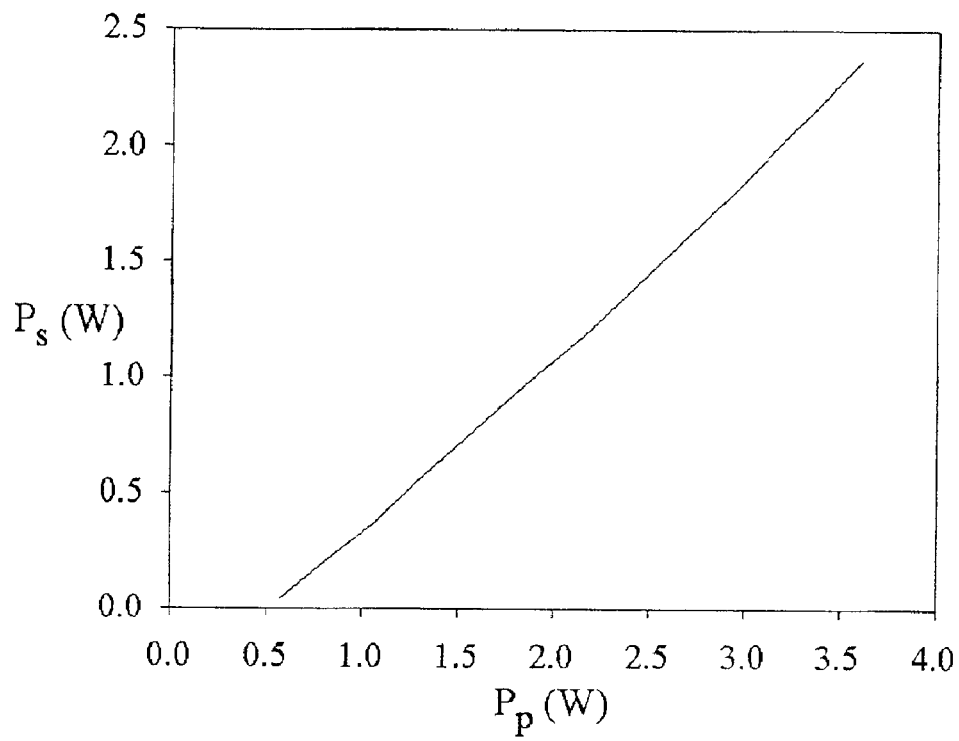
Figure 23:
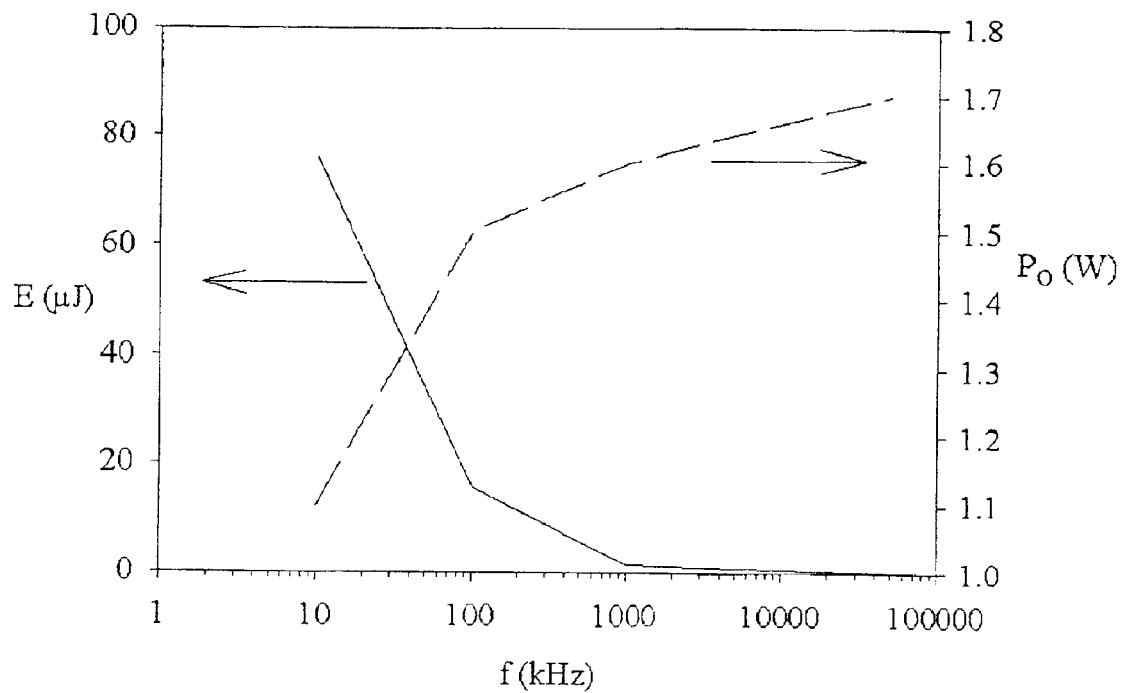
Figure 25:
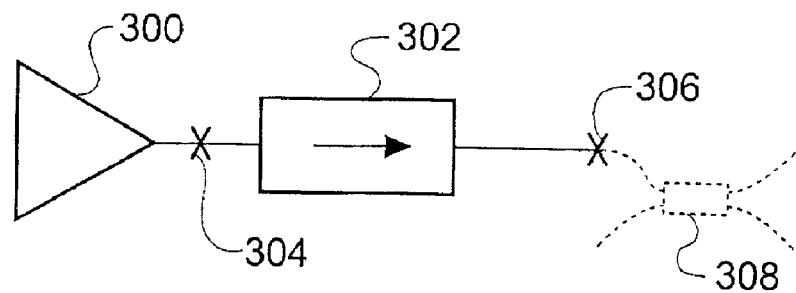
Figure 26:
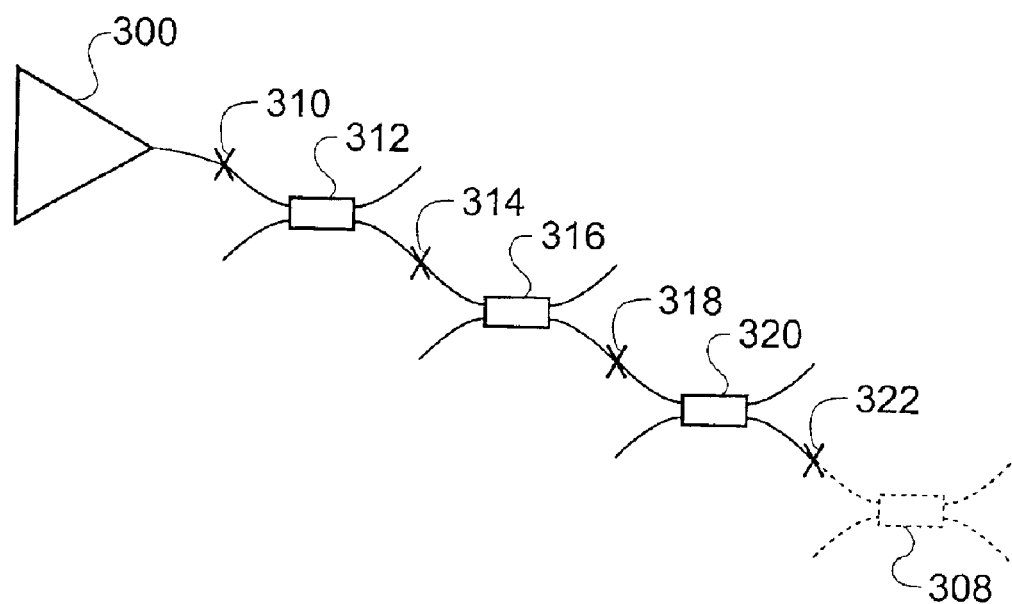
Figure 27:
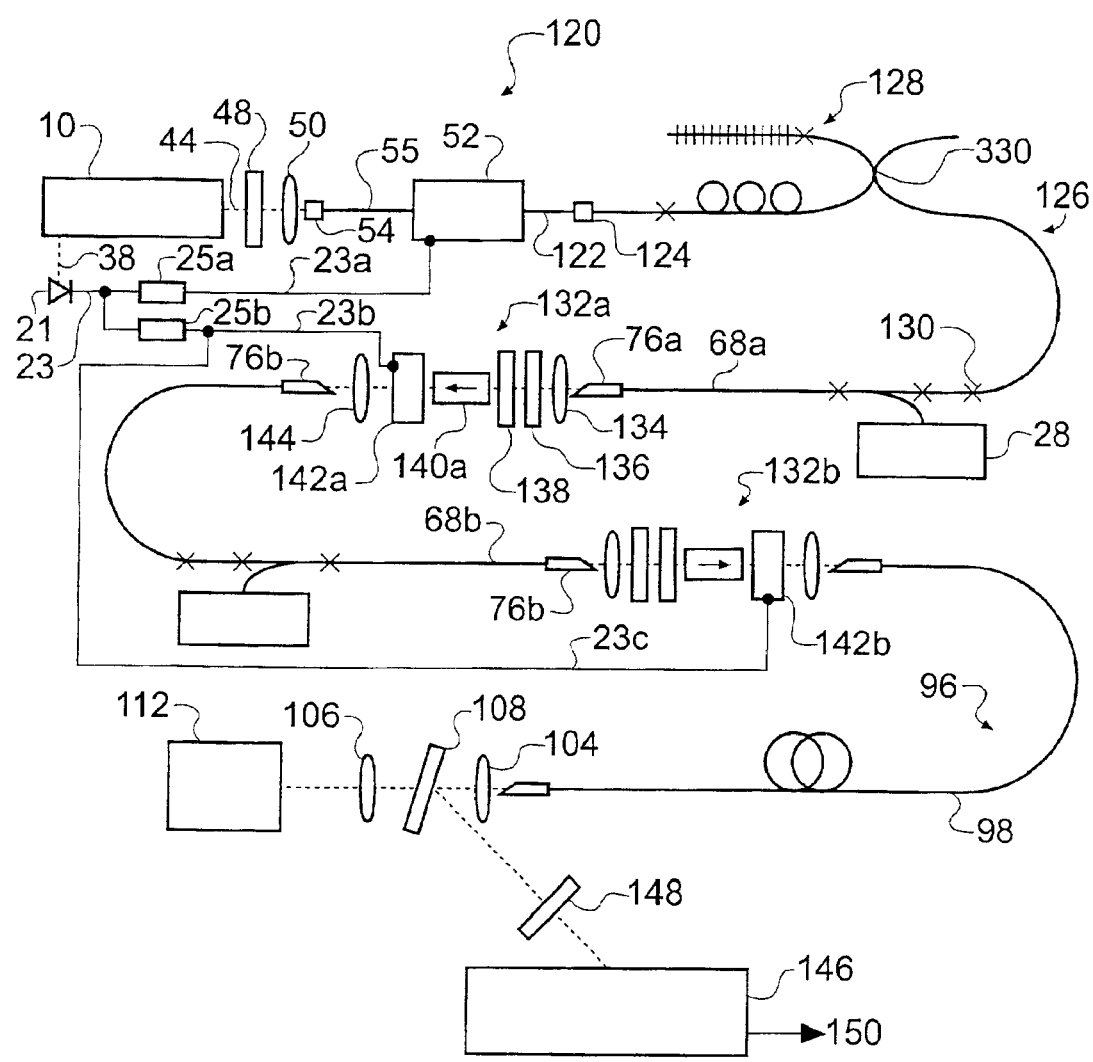
Figure 28:
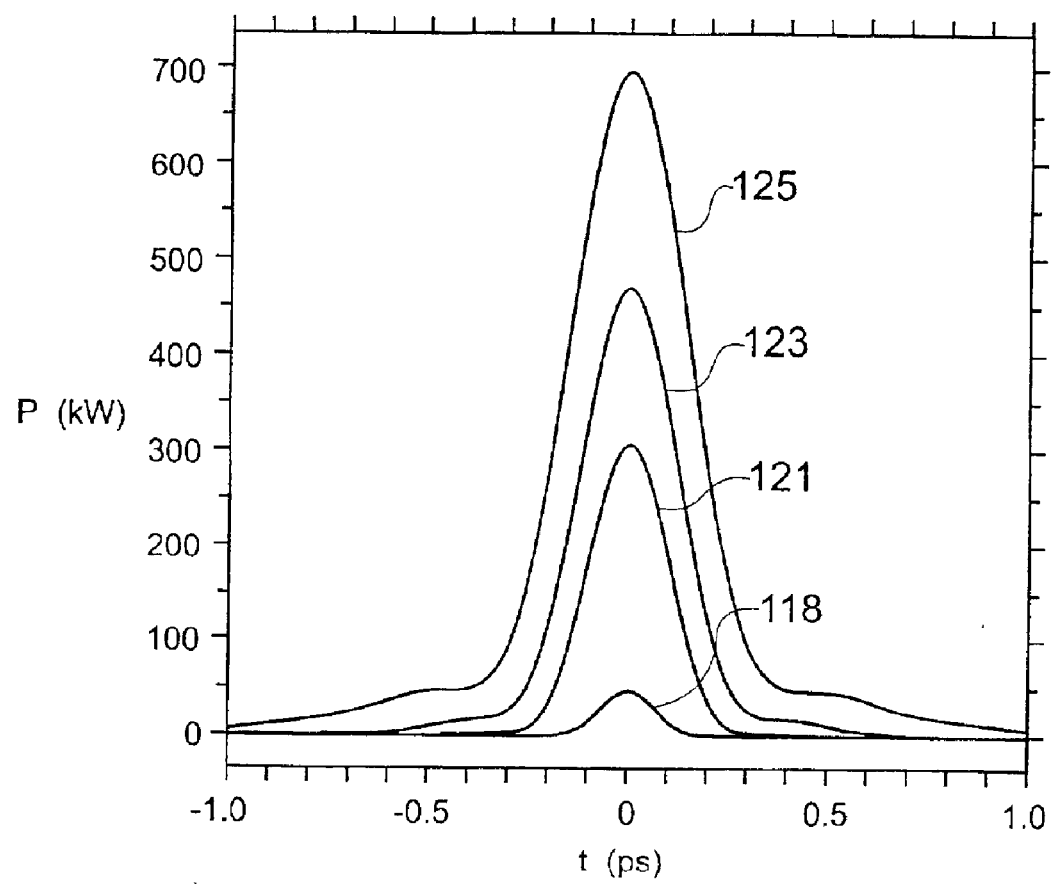
Figure 29:
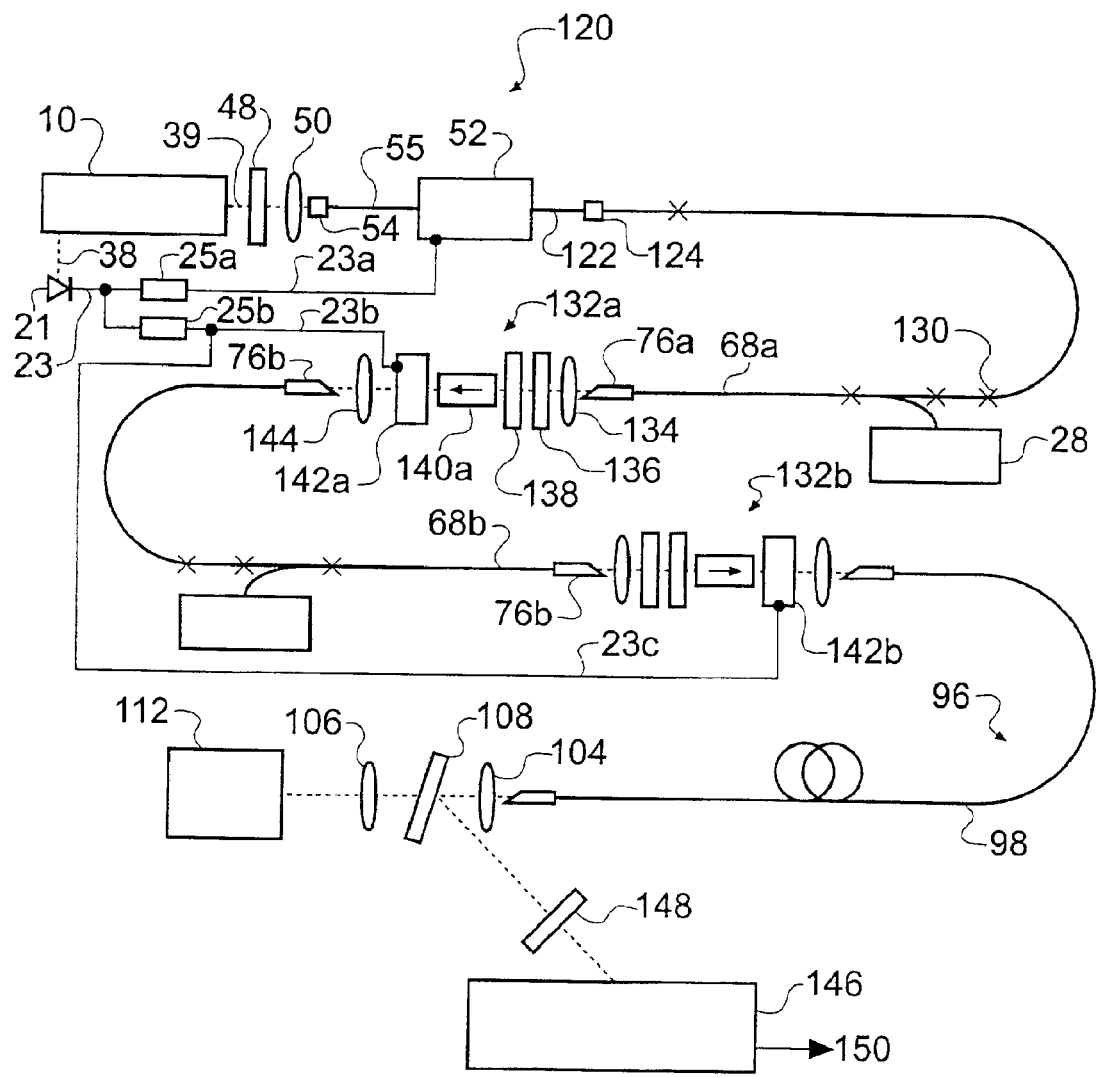
Figure 30:
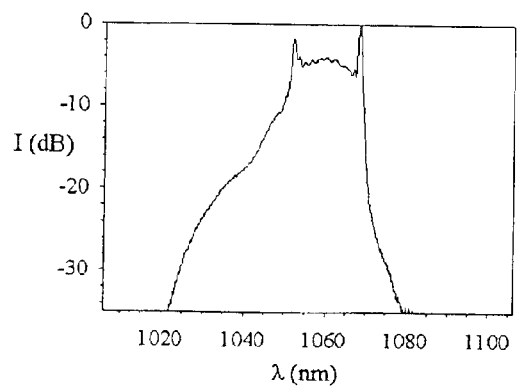
Figure 31:
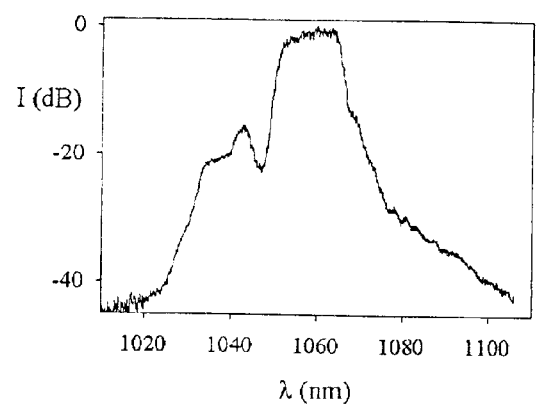
Figure 32:
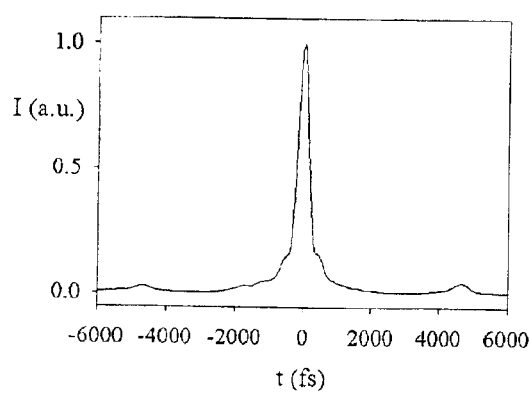
Figure 33:
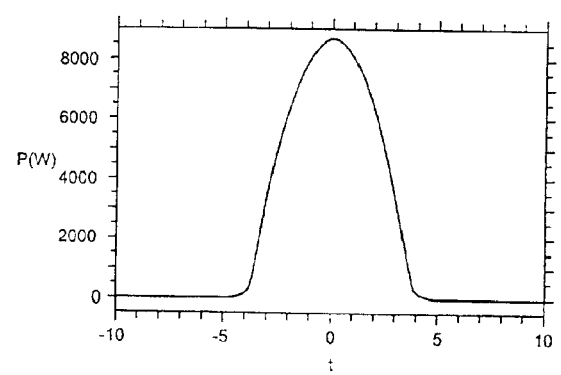

FIG. 15 shows a plot of a theoretical gain of the pre-amplifier of FIG. 14, obtained by modeling;

FIG. 16 shows a plot of measured amplified spontaneous emission generated by the pre-amplifier of FIG. 14;

FIG. 17 shows a plot of the measured gain of the pre-amplifier of FIG. 14;

FIG. 18 shows a plot of the measured power of the pre-amplifier of FIG. 14;

FIG. 19 shows a schematic diagram of a fiber power amplifier forming part of the light source of FIG. 1;

FIG. 20 shows a plot of the measured profile of the refractive index of an optical fiber forming part of the power amplifier of FIG. 19;

FIG. 21 shows a schematic cross-sectional diagram of the optical fiber whose refractive index profile is shown in FIG. 20;

FIG. 22 shows a plot of the measured output power obtained from a laser oscillator comprising the optical fiber whose refractive index profile is shown in FIG. 20;

FIG. 23 shows a plot of the measured output power of the power amplifier of FIG. 19;

FIGS. 24(a), 24(b), 24(c) and 24(d) show measured spectra of pulses amplified by the power amplifier of FIG. 19;

FIG. 25 shows a schematic diagram of a pump source with optical isolation according to an embodiment of the invention;

FIG. 26 shows a schematic diagram of a pump source with optical isolation according to a further embodiment of the invention;

FIG. 27 shows a detailed schematic diagram of the light source of FIG. 1;

FIG. 28 shows plots of the results of a numerical simulation of the operation of the light source of FIG. 27;

FIG. 29 shows a detailed schematic diagram of a light source according to a further embodiment of the present invention;

FIG. 30 shows a measured spectrum of light pulses from the light source of FIG. 29;

FIG. 31 shows a further measured spectrum of light pulses from the light source of FIG. 29;

FIG. 32 shows an autocorrelation of light pulses from the light source of FIG. 29; and FIG. 33 shows a plot of the result of numerical modeling of the operation of the light source of FIG. 29.

DETAILED DESCRIPTION OF THE INVENTION

FIG. 1 shows a schematic block diagram of an embodiment of a pulsed light source 120 according to the present invention. The light source 120 comprises, in sequence, a laser oscillator 10, a pulse selector 52, and a fiber amplifier cascade 126. The fiber amplifier cascade 126 comprises a pulse stretcher 128, a first fiber pre-amplifier 68a, a first time gating device 132a including an optical isolator, a second pre-amplifier 68b, a second time gating device 132b including an optical isolator, a fiber power amplifier 96 and a pulse compressor 146.

The laser oscillator 10 is configured to generate pulses of coherent radiation, the pulses having a defined repetition rate and energy. In use the pulses pass from the laser oscillator 10 to the pulse selector 52, which reduces the repetition rate of the pulses so that the average power of the pulses is reduced. After this reduction in repetition rate, the pulses enter the fiber amplifier cascade 126 where they first pass through the pulse stretcher 128 which increases the duration of the pulses. The pulses are then amplified in the first pre-amplifier 68a, pass through the first time gating device 132a, and are then further amplified by the second pre-amplifier 68b. They then pass through the second time gating device 132b before being amplified for a final time in the fiber power amplifier 96. After amplification, the pulses are compressed in the pulse compressor 146 before leaving the light source as a final output 150.

Illustrative embodiments of individual components of the light source 120 shown in FIG. 1 will now be described in greater detail, as will embodiments of the light source 120 as a whole. The reference numerals used in FIG. 1 are adhered to throughout to indicate corresponding features in the other Figures.

Laser Oscillator

FIG. 2 shows a schematic diagram of the laser oscillator 10 shown in FIG. 1. The laser oscillator 10 has a cavity following a Fabry-Perot design. A length (approximately 1 m) of high concentration, single mode optical fiber 12, having a cladding and a core, and doped with ytterbium ions ($Yb^{3+}$) serves as the gain medium. The $Yb^{3+}$-doped fiber is doped with ~1500ppm $Yb^{3+}$ ions, has a numerical aperture (NA) of 0.18, and a lower limit to its wavelength transmission of ~940nm. The refractive index profile has a step-index core.

A fiber wavelength division multiplexer (WDM) 14, designed for operation at 978/1050 nm, is coupled to a first end of the $Yb^{3+}$-doped fiber 12 and is used to couple light from a pump laser 16. The pump laser 16 is a pigtailed grating-stabilized semiconductor diode laser producing light at 976 nm. The fiber of the pigtail is spliced to the fiber of the WDM 14. A length of single mode optical fiber 18 doped with boron is coupled to the other end of the $Yb^{3+}$-doped fiber 12 and is angle polished at its far end to provide a single mode low loss end for the $Yb^{3+}$-doped fiber 12.

A pair of mirrors define the ends of the cavity, being a high reflector 20 at one end, and a semiconductor saturable absorber mirror (SESAM) 22 at the other. A telescope objective 24 is used to focus light exiting the boron fiber polished end 18 onto the SESAM 22. The telescope objective 24 comprises two lenses 26, 28 having, in one embodiment, focal lengths of 8.24 mm and 11 mm respectively.

A further lens 30, having, for example, a focal length of 8.18 mm, is used to focus light exiting the free end of the WDM 14. The free fiber end of the WDM 14 is angle polished. Beyond this lens 30, the cavity further comprises a quarter-wave plate 32, a half-wave plate 34, and a first polarizing beam splitter (PBS) 36, the latter two of which are anti-reflection coated. The first PBS 36 acts to split light incident upon it to form a first laser output 38 which exits the cavity, a second laser output 39 which exits the cavity, and a through beam which oscillates within the cavity. The first laser output 38 forms a secondary output, the use of which will be explained later. A second half-wave plate 40 is located beyond the first PBS 36, which is followed by a second PBS 42. The second PBS 42 acts to split light incident upon it into a third laser output 44 which exits the cavity, and a through beam which oscillates in the cavity. The third laser output 44 forms the principal output of the laser oscillator 10. A bulk grating pair 46 is situated between the second PBS 42 and the high reflector 20, and provides intracavity dispersion compensation. The first PBS 36 and the optical fiber 12 together form a non-linear polarization rotation switch for the purpose of modelocking the output of the laser oscillator 10 into ultrashort pulses by the conventional nonlinear polarization rotation switching technique.

All intracavity optics are anti-reflection coated at the wavelength to be generated by the oscillator 10, to avoid etalon effects.

A fast photodiode detector 21 is located in the beam path of the first laser output 38 which detects the pulses leaving the cavity by the first laser output 38, and produces an electrical signal representing the repetition rate of the pulses. A cable 23 carries the electrical signal to a delay generator 25a which puts a delay on the electrical signal so that the repetition rate of the signal is reduced below the pulse repetition rate. The delay generator 25a is electronic and outputs a square pulse of a set duration a set time after receiving an input signal, in this case the pulses of the pulsed electronic signal from the detector 21. The set time can be altered to vary the delay. The set duration of the square pulse can also be altered. The delayed electrical signal is used as a drive signal or trigger signal for pulse selection, as will be described shortly.

A third half-wave plate 48 is located outside the cavity, in the path of the third laser output 44, and is followed by a lens 50, and a pulse selector 52. The lens acts to focus the second laser output 44 into a fiber coupler 54 and a length of undoped single mode optical fiber 55 which is the input to the pulse selector 52. The pulse selector 52 will be described in more detail later.

In an embodiment laser oscillator 10 produces ultrashort pulses at a wavelength of 1.05 µm, having a duration of ~110 fs following compression by the grating pair 46, a repetition rate of 54 MHz, pulses energies of 30 pJ, and an average power of 2.5 mW. The pump power required for this is ~80 mW.

The cavity design is a so caled strech pulse cavity [1, 8]. This cavity design produces ultrashort pulses from fiber lasers by providing sections of large positive dispersion and large negative dispersion within the cavity. As mentioned, the ultrashort pulses are generated by modelocking, using non-linear polarization rotation switching to provide operation in the ultrashort regime, which is initiated by the action of the SESAM 22 [9]. The SESAM 22 gives reliable self-start modelocking. The grating pair 46 provides intracavity dispersion compensation for second order dispersion, to remove frequency chirp arising from the optical nonlinear properties of the fibers, and to shorten the pulses.

A pair of prisms can instead be used to provide the dispersion compensation, but as the separation of the prisms needs to be greater than 1 m, a grating pair is to be preferred to keep down the size of the oscillator. Alternatively, holey fiber [10] can be used to provide dispersion compensation. Additionally, the telescope objective 24 and the lens 30 can be replaced by GRIN lenses directly butted to the fiber ends.

There are three types of fiber in the laser cavity: the $Yb^{3+}$ doped active fiber 12, the WDM fiber 14, and boron-doped fiber 18. The boron-doped fiber 18 is used in one of the angle polished ends. The boron-doped fiber 18 for the polished ends is single mode at 1 µm, and low loss.

Figure 3:
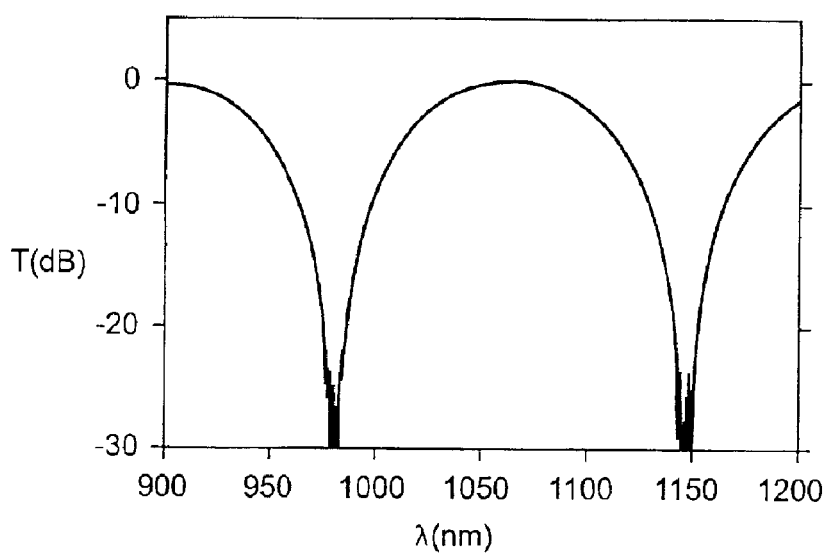
FIG. 3 shows a plot of the measured signal transmission of a wave division multiplexer forming part of the laser oscillator of FIG. 2.

The desirable requirements for the WDM 14 are that it be low loss at the operating wavelength of the oscillator 10 (1055 nm), and that it should have good pump coupling into the cavity at the pump wavelength of 978 nm. FIG. 3 shows a plot of the variation of signal transmission T with wavelength λ of the WDM, indicating that the WDM has reasonably flat transmission from 1040–1080 nm, and efficient out-coupling (for the pump) around 980 nm.

The requirements for the $Yb^{3+}$ doped fiber 12 are that it be single mode, absorb the pump light efficiently, and provide sufficient round trip gain. Unlike second order dispersion, third order dispersion in the cavity, arising partly from the $Yb^{3+}$ doped fiber 12, is increased rather than compensated for by the dispersion compensation 48. Therefore, to minimize pulse-distorting effects, the length of active $Yb^{3+}$ doped fiber 12 within the cavity needs to be minimized.

The SESAM 22 is used to initiate modelocking, and is necessary because of the inherent stability of Fabry-Perot oscillator cavities against ultrashort pulse formation. To achieve modelocking, the conflicting requirements of a low depth of modulation in intracavity power (to avoid the onset of undesirable Q-switched mode-locking) and a high modulation depth (to provide a sufficient perturbation in the high loss cavity) have to be satisfied. Eleven SESAMs were tested to find out which best met these requirements. The SESAMs are of the low finesse anti-resonant Fabry-Perot type (AFPSA) [9, 11] as typically used in ultrashort pulse sources. The performance of the entire range of SESAMs was characterized.

Figure 4:
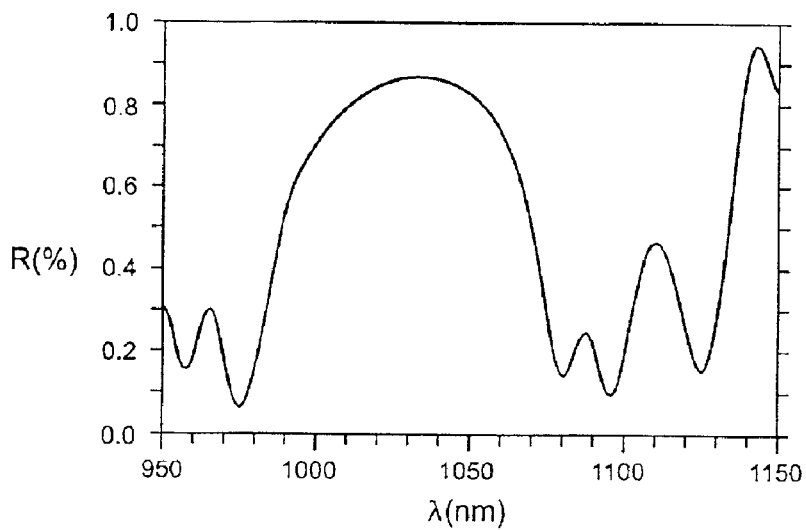
FIG. 4 shows a plot of the measured reflectivity of a semiconductor saturable absorber mirror (SESAM) forming part of the laser oscillator of FIG. 2.

FIG. 4 shows a plot of the variation of reflectivity R at 400° C. with wavelength λ of a suitable SESAM 22 used in the oscillator 10, and illustrates the modulation depth of the reflectivity.

Figure 5:
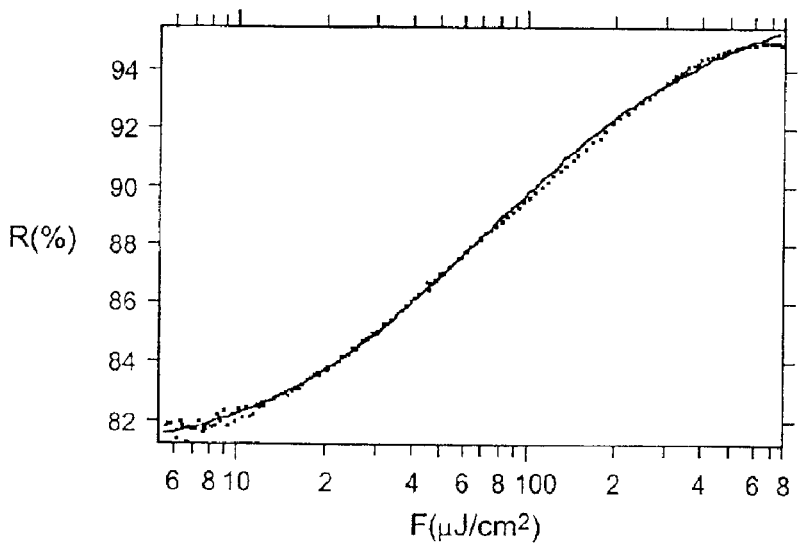
FIG. 5 shows a plot of the measured modulation depth of the SESAM whose reflectivity is shown in FIG. 4.

FIG. 5 shows a plot of the variation of reflectivity R with fluence F of a suitable SESAM 22 used in the oscillator 10. This plot corresponds to the modulation depth of the SESAM 22, and indicates the saturation fluence required for bleaching of the SESAM 22.

The SESAM 22 has a slow time constant of ~3 ps, a fast time constant of ~100 fs, and a modulation in reflectivity of ~10%. The most reliable Q-switch-free operation and robust self-starting of modelocking is obtained with the telescope objective 24 described above. Alternatively, 1:1 focussing or directly butting the end of the fiber 18 to the SESAM 22 can be used.

To optimize the laser oscillator performance, the separation of the grating pair 48 was varied to control the net cavity dispersion. With excess negative dispersion, soliton mode locking can be obtained, where the pulse is sustained because of a balance between group velocity dispersion (GVD) and self phase modulation (SPM), and excess energy transferred to the low intensity wings of the pulse is removed by nonlinear polarization switching after each cavity round trip. With approximately nil net cavity dispersion, the cavity operates in stretch-pulse configuration. Pulses were maintained by nonlinear polarization rotation switching, as previously described. The pulses are spectrally broader and have a shorter duration compared to solitons. In one embodiment, optimum performance in stretch-pulse mode is obtained with a grating separation between gratings of the grating pair 46 of 5.3 cm. Data presented subsequently herein were all recorded with that grating separation held fixed.

As is well known, the power of the pump light must increase the gain of the oscillator 10 above the laser threshold. However, if the pump power is high, there is sufficient gain such that the energy of the oscillating pulse will exceed a threshold for breaking into multiple pulses. This is a known effect in soliton lasers. In some embodiments, the threshold launched pump power for the oscillator 10 is >60 mW, While multiple pulses are observed for launched pump powers above 80 mW (The threshold values change as the intra-cavity wave plates are adjusted.). There is only ~2 mW of hysteresis between the continuous wave and modelocking thresholds when increasing compared to decreasing the pump power.

Figure 6:
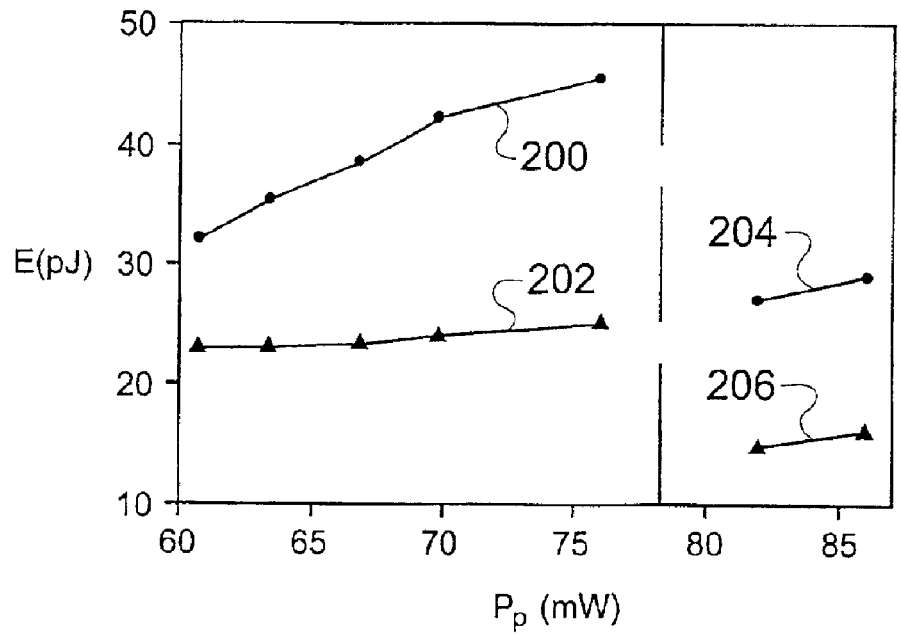
FIG. 6 shows plots of the measured energy of light pulses generated by the laser oscillator of FIG. 2.

FIG. 6 shows plots of the variation of output pulse energy E from the first and third laser outputs with pump power $P_P$, for single and multiple pulse operation. Plots 200, 202, 204 and 206 respectively show single pulse output from the third laser output, single pulse output from the first laser output, multiple pulse output from the third laser output, and multiple pulse output from the first laser output.

Figure 7:
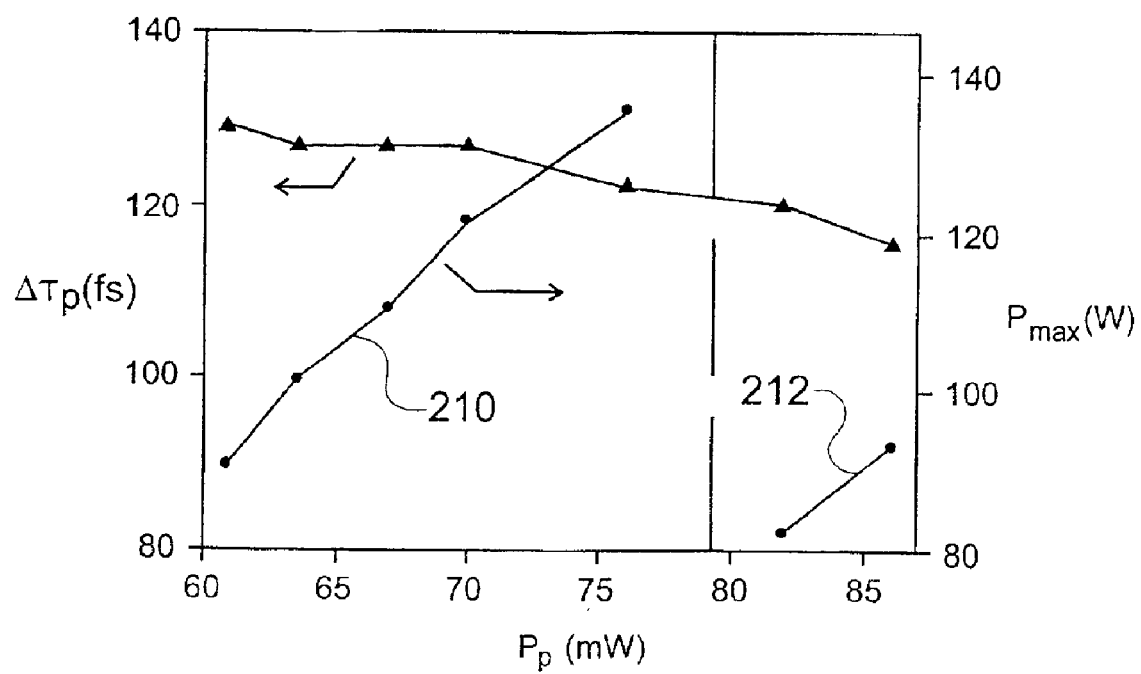
FIG. 7 shows plots of the measured width of light pulses generated by the laser oscillator of FIG. 2.

FIG. 7 shows plots of the variation of pulse width (full width half maximum, FWHM) $\Delta\tau_P$ (plot 208) with pump power $P_P$, and also of pulse peak power $P_{max}$ from the first and third laser outputs with pump power $P_P$, for single (plot 210) and multiple pulse (plot 212) operation.

As has been mentioned, the oscillator 10 has first, second and third laser outputs 38, 39, 44. The first and third outputs 38, 44 are situated after the fiber section of the cavity and consequently these pulses have a positive linear chirp as they have not passed through the grating pair 46. The first laser output 38 is the "rejected" output, i.e. the portion of the pulse not passed by the nonlinear polarization switching elements.

Figure 8:
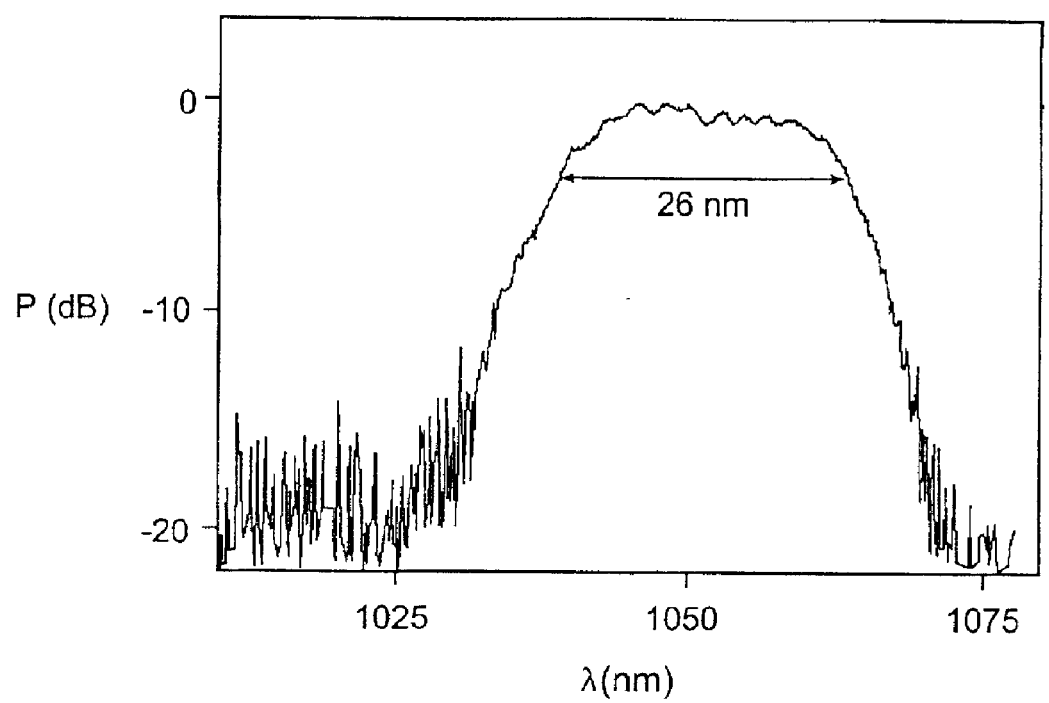
FIG. 8 shows a measured spectrum of light pulses generated by the laser oscillator of FIG. 2 and leaving the oscillator from a first output.

FIG. 8 shows the measured spectrum of pulses (as power P against wavelength λ) leaving laser oscillator 10 from the first laser output 38. The FWHM bandwidth is 26 nm.

Figure 9:
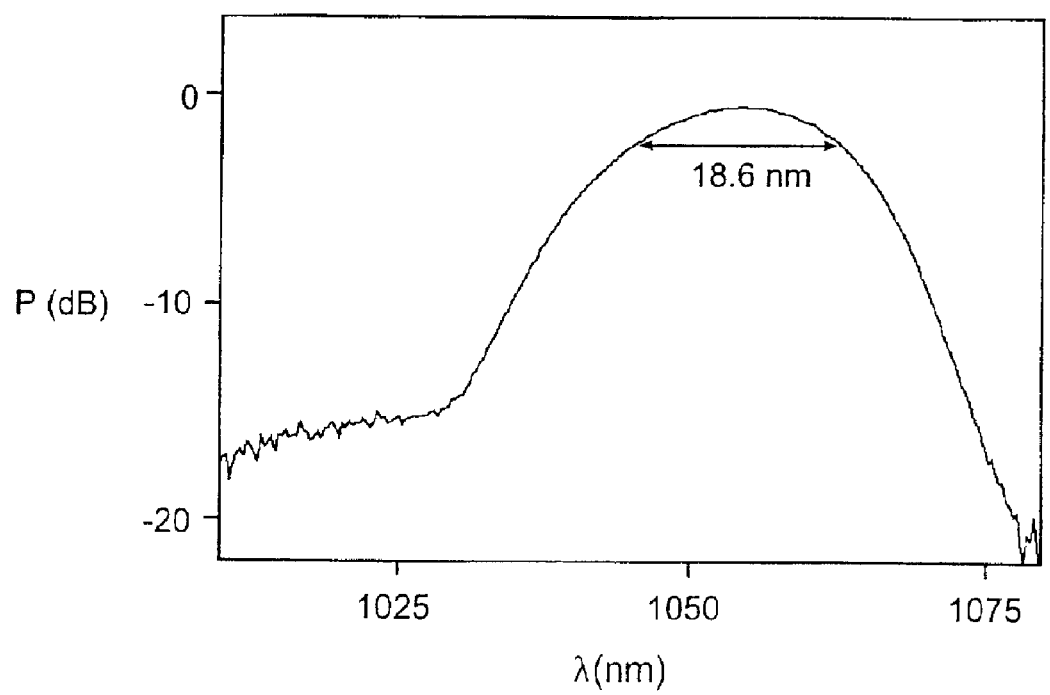
FIG. 9 shows a measured spectrum of light pulses generated by the laser oscillator of FIG. 2 and leaving the oscillator from a second and a third output.

FIG. 9 shows the measured spectrum of pulses (as power P against wavelength λ) leaving the laser oscillator 10 from the second laser output 38 and the third laser output 44, having therefore been passed by the switching elements. The FWHM bandwidth is 18.6 nm.

From FIGS. 8 and 9, it can be seen that the spectrum at the first laser output 38 is much less smooth than at the second and third laser outputs 39, 44, which are true fractions of the circulating pulse. Therefore it is the third laser output 44 which is passed to the pulse selector for subsequent amplification. The pulses were measured for FIGS. 8 and 9 after encountering a Faraday rotator-based optical isolator which contains polarizing cubes and a terbium gallium garnet (TGG) crystal. These isolator elements introduce additional dispersion of the same sign as the fibers in the oscillator. Therefore, the pulse width at the first and third laser outputs 38, 44 (measured FWHM after isolator= 2.5 ps) is increased by the isolator because the pulses have not been compensated for intracavity dispersion. Conversely, the pulse width at the second laser output 39 (measured FWHM after isolator=0.6 ps) is decreased. From the difference between these pulse widths, it was calculated that the isolator had the same dispersion effect as ~1 m of fiber at a wavelength of 1.05 $\mu$m.

Figure 10:
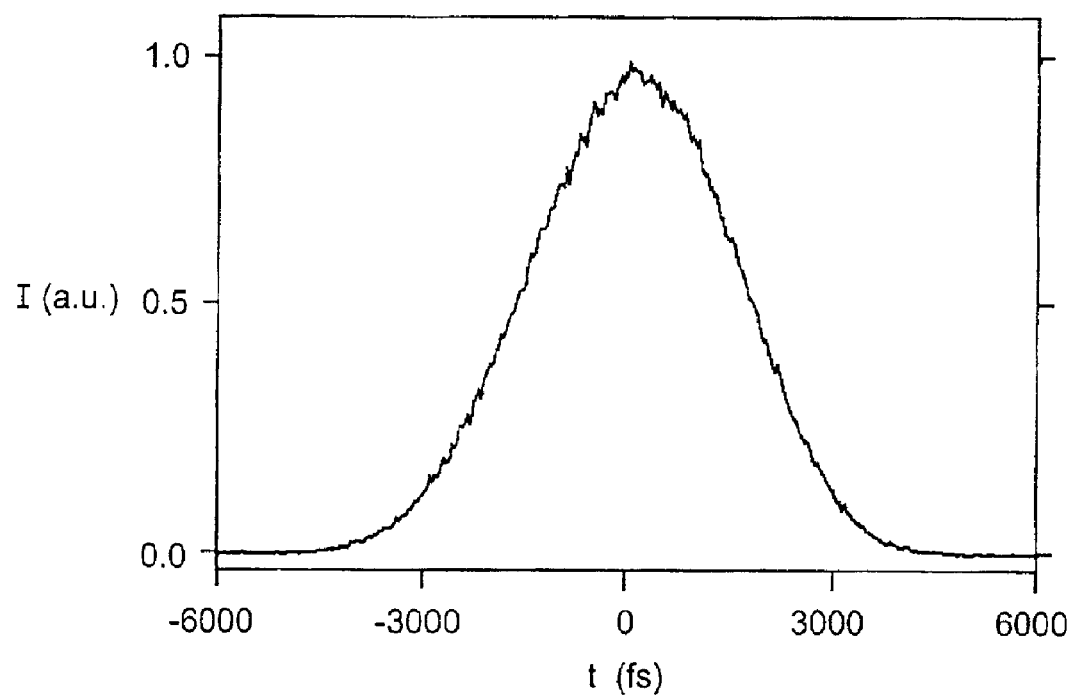
FIG. 10 shows a measured autocorrelation of light pulses generated by the laser oscillator of FIG. 2.

FIG. 10 shows an autocorrelation of uncompressed pulses from the first and third laser outputs (as a function of second harmonic intensity I against delay t), with the FWHM of 2.5 ps mentioned above.

Figure 11:
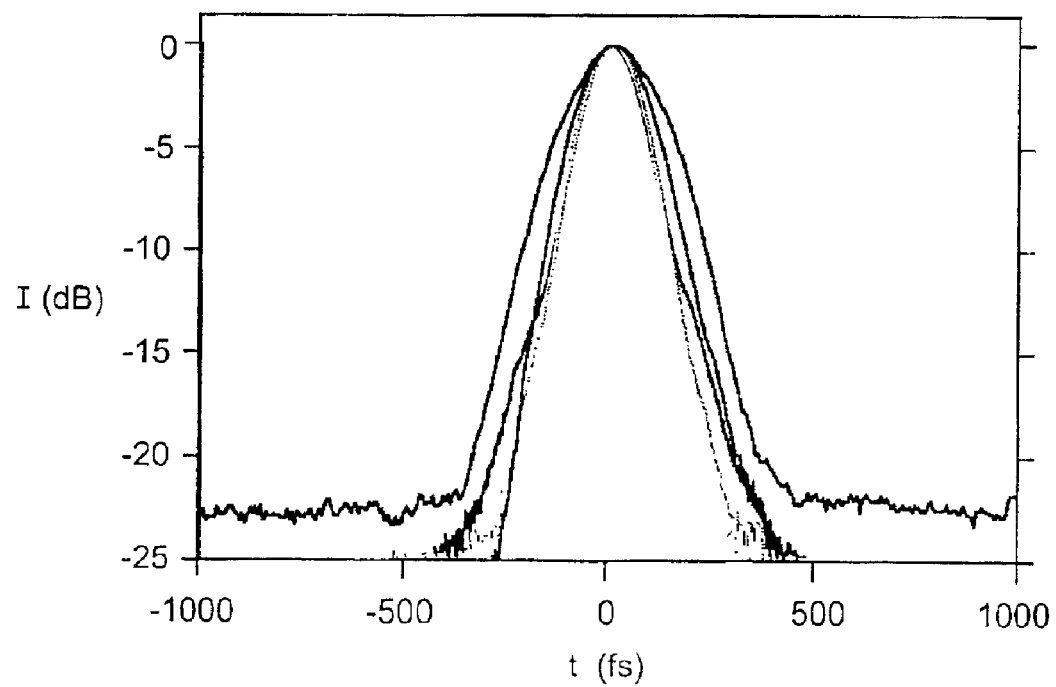
FIG. 11 shows further measured autocorrelations of light pulses generated by the laser oscillator of FIG. 2.

FIG. 11 shows autocorrelations of pulses compressed by various means (as a function of second harmonic intensity I against delay t). The various traces are obtained by compression with a grating pair and also with alternative fiber-based compression means, namely:

Trace 56 compression with a grating pair, from first laser output 38

(FWHM=108 fs)

Trace 58 compression with a grating pair from third laser output 44

(FWHM=108 fs)

Trace 60l compression with a standard fiber compressor from second laser output 39 (FWHM=136 fs)

Trace 62 compression with a holey fiber compressor from the third laser output 44 (FWHM=168 fs).

FIGS. 12(a) and 12(b) show radio frequency (RF) power spectra of the fundamental (53.7 MHz) and $7^{th}$ harmonic peaks of the pulse repetition rate, as plots of power P against frequency f. The absence of any sidebands on the fundamental peak for offsets of up to 250 kHz and with a noise background less than 75 dB implies excellent amplitude stability noise. Fluctuations are less than 0.05%, this measured value being limited only by measurement resolution. Overall, the oscillator is self-starting and robust to environmental disturbances.

Pulse Selector

FIG. 13 shows the pulse selector 52 in more detail. The pulse selector 52 acts to reduce the repetition rate of the ultrashort pulses generated by the laser oscillator 10. It is an integrated optical intensity, or amplitude, modulator having a high extinction ratio, and available, for example, as product No. AM.ST.A.106.08/HER sn 68L from Alenia Marconi Systems. The extinction ratio at 25° C. for a wavelength of 1060 nm is greater than 50 dB, so that high quality pulse selection can be achieved. Also, the insertion loss at 1060 nm is low, being 4.1 dB. Alternatively, other pulse selectors may be used, for example Pockels cells or acousto-optic modulators. Preferably, however, the extinction ratio should be at least 40 dB.

The pulse selector 52 has the form of a Mach-Zehnder interferometer 220 having two arms and fabricated on a lithium niobate substrate 222. An input waveguide 224 is arranged to receive pulses from the principal laser output. The input wave guide 224 is split by a Y-splitter 225 to form the two arms 226 and 228 of the interferometer 220 . A signal electrode 230 and two ground electrodes 232, 234 are suitably arranged along the arms 226, 228. Electrical signals can be applied to the electrodes to vary the optical path length difference between the arms 226, 228 by use of the electro-optic effect in the lithium niobate. The arms 226, 228 recombine at a second Y-splitter 236 to form an output waveguide 238, which is the output of the pulse selector 52. Light components passing through the two arms 226, 228 will interferometrically recombine at the second Y-splitter 236.

The pulses from the oscillator 10 enter the pulse selector 52 , and are split between the two arms 226, 228 at the first Y-splitter 225, to form two light components. The delayed electronic trigger signal from the delay generator 25a is fed to the electrodes 230, 232, 234 to vary the path length difference between the arms 226, 228 so that when the components recombine at the second Y-splitter 236, they either destructively interfere, giving no output from the pulse selector 52, or constructively interfere, so that a pulse is output from the pulse selector 52. In this way, the repetition rate of the pulses from the oscillator 10 can be reduced by "removing" some of the pulses by destructive interference, or by "selecting" others through constructive interference. The width of the square pulses in the trigger signal is set to provide a "window" of constructive interference conditions long enough to pass one laser pulse per square pulse, so that the repetition rate of the laser pulses is reduced to the repetition rate of the trigger signal, as set by the delay generator 25a.

IN some embodiments, pulse selector 52 reduces the pulse repetition rate from ~54 MHz to ~10 kHz.

Fiber Pre-Amplier

FIG. 14 shows a schematic diagram of a fiber pre-amplifier 68 as shown in FIG. 1. The pre-amplifier 68 comprises an initial length of single mode $Yb^{3+}$-doped fiber 70, having a cladding and a standard core size of ~6 μm, and which is indirectly pumped, as will be explained shortly. This indirectly pumped fiber 70 is coupled to a fiber WDM 72 to allow light from a pump source laser 78 to be coupled into the pre-amplifier 68. The pump laser 78 is a fiber pigtailed high brightness master-oscillator-power-amplifier (MOPA) diode laser, the fiber pigtail being coupled to the fiber of the WDM 72. The WDM 72 is in turn coupled to a second length of $Yb^{3+}$-doped fiber 74, which is the amplification medium of the pre-amplifier 68. Fiber 74 has a core and a cladding and is a single mode standard core size fiber. The two ends 76 of the pre-amplifier 68 are angle polished for low loss coupling of the input and output beams, indicated by arrows in FIG. 14. The incoming beam passes through the cores of the indirectly pumped fiber 70 and the WDM 72 where the pump light is coupled into the pre-amplifier 68 in a forward pumping configuration. The pump light is coupled into the core of amplification medium fiber 74 The input beam is then amplified by the pump beam in the core of the amplification medium fiber 74, in the known fashion.

A forward pumping configuration is used for the pre-amplifiers, 68a and 68b, because it gives low noise amplifier operation. It is desirable to minimize noise in the early stages of the amplifier cascade 126, because any noise will be amplified by later stages and will reduce pulse quality. Forward pumping gives a large signal to noise ratio because the gain is maximized in the initial part of the fiber, so that the majority of the amplification occurs before the pulses have propagated very far along the fiber.

The pump laser may alternatively be a high-brightness diode laser, which has a Fabry-Perot cavity configuration and is grating-stabilized. This is preferable to a MOPA as lasers of this type have better performance, and are less costly and more readily available. However, they also have lower output powers than MOPAs, so that it may be necessary to configure the pre-amplifier to minimize losses at the pump wavelength. A further alternative for the pump laser is a optical fiber-based laser.

The embodiment of the invention shown in FIG. 1 includes an amplifier cascade 126 comprising two pre-amplifiers, 68a and 68b, of the construction shown in FIG. 14. In one embodiment, the two pre-amplifiers 68 preferably have the following characteristics:

TABLE 1

|  | First Pre-amplifier | Second Pre-amplifier |
| --- | --- | --- |
| Length of indirectly pumped fiber | 0.5 m | 1.2 m |
| Length of amplification medium fiber | 3 m | 2.5 m |
| Pump laser wavelength | 966 nm | 975 nm |
| Pump laser input power | 150 mW | 220 mW |
| Small signal gain at 1.05 μm | 25 dB | 27 dB |
| Saturation output power | 50 mW | 110 mW |

The function of the indirectly pumped fibers 70 in the pre-amplifiers, 68a and 68b, is explained as follows: In the 1.0–1.1 μm range, the peak of the emission cross-section of (975 nm pumped) $Yb^{3+}$ in silica fiber is at 1030 nm. The absorption cross-section is also maximized around 1030 nm, but is smaller than the emission cross-section at that wavelength. Consequently a high inversion fraction and strong pumping are required to create gain at 1030 nm. Gain at 1030 nm will only occur near the pump end of the fiber. The gain is accompanied by amplified spontaneous emission (ASE) also at 1030 nm. Importantly, the absorption cross-section decreases more rapidly than the emission cross-section at longer wavelengths e.g. 1060 nm. As a result, a much lower inversion can create gain at 1060 nm. The gain may possibly be pumped by re-emitted 1030 nm light. Also, gain at 1060 nm is possible further away from the pump end of the fiber. This gain occurs in a part of the fiber where there is net absorption of 1030 nm light. The light source according to the present embodiment operates with a ~1060 nm signal, so 1030 nm ASE emitted from the pump end of the fiber is "lost" power. In a recent paper [12] concerning long wavelength (1570 nm–1610 nm) $Er^{3+}$ doped fiber amplifiers, a similar relationship between the absorption and emission cross-sections at shorter and longer wavelengths is also seen to lead to "lost" shorter wavelength (1550 nm) ASE near the pump. The authors demonstrated that adding a second length of fiber at the pump end of the amplifier to absorb the "lost" short wavelength ASE created additional gain of up to 4 dB at longer signal wavelengths. This additional fiber does not directly receive any pump light, but may be considered as being indirectly pumped in so far as it is pumped by the ASE.

FIG. 15 shows the results of theoretical modeling of pre-amplifiers having the construction of that shown in FIG. 14, as a graph of small signal gain G against fiber length l. The modeling confirms that by adding a second piece of doped fiber to absorb "lost" 1030 nm ASE, the amplifier gain at 1055 nm is increased by ~3 dB compared to the gain with a single length of doped fiber. Note that in FIG. 15 the individual lengths of the two pieces of doped fiber are not specified—instead the proportion of the total length of doped fiber on either side of the pump is shown. The small signal gain G is shown for the pump being injected at various points along the fiber length: 0% (plot 80), 10% (plot 82), 20% (plot 84), 30% (plot 86), 40% (plot 88) an (plot 90).

The required lengths of amplification medium and indirectly pumped $Yb^{3+}$-doped fiber required to tune the gain peak to ~1050 nm [4] in the two pre-amplifiers, 68a and 68b, differ in this embodiment. This is because different pump wavelengths are used (see Table 1). Alternatively, equal pump wavelengths can be used, in which case the same lengths of fiber will be required in each pre-amplifier 68a and 68b.

The parameters for the model shown in FIG. 15 are those of midway forward pump injection for a pump wavelength of 975 nm, a pump power of 220 mW, a signal wavelength of 1056 nm, and a fiber core diameter of 5μm.

As an alternative to the core-pumped pre-amplifier 68 of FIG. 14, cladding-pumped pre-amplifiers may be utilized. Cladding pumping has the advantage of being able to use medium brightness diode lasers as the pump laser, which are less expensive than the high brightness diode lasers required for core pumping (in embodiments using diodes lasers rather than MOPAs or fiber lasers). A typical arrangement for launching pump light into the inner cladding of the fiber amplification medium is to use a lens pair and dichroic mirror.

A reasonably small signal gain (~30 dB) can be obtained from a pre-amplifier pumped in this way, having ~2.5 m doped fiber length; the pump to signal optical efficiency being ~10%.

FIG. 16 shows the ASE spectrum for the first pre-amplifier 68a, as a power spectrum P against wavelength λ. ASE in the forward (plot 92) and backward (plot 94) directions is shown. The spectra are reasonably flat from 1030to 1065nm.

FIG. 17 shows a graph of the gain G against input power $P_I$ for the first pre-amplifier 68a. A maximum gain of ~25 dB was measured. FIG. 18 shows a graph of output power $P_O$ against input power $P_I$ for the first pre-amplifier 68a. An output of ≦50 mW was measured. The second pre-amplifier 68b has similar gain characteristics to the first pre-amplifier 68a.

Fiber Power Aplifier

FIG. 19 shows a schematic diagram of the fiber power amplifier 96 shown in FIG. 1. In one embodiment, the fiber power amplifier 96 comprises a 3 m length of large mode area (LMA) optical fiber 98. The LMA fiber 98 serves as the amplification medium of the power amplifier, and is doped with $Yb^{3+}$ ions.

So-called large mode area (LMA) fiber has a number of features which make it advantageous for use in the power amplifier. It has a large core with diameter approximately five times the diameter of standard single mode fiber (the LMA fiber used in the power amplifier 96 has a diameter of 20 μm), surrounded by an inner cladding and an outer cladding. The large core gives a mode area approximately 10 to 100 times that of standard single mode fiber, but the core has a low numerical aperture (NA) value (in this case, 0.06), so that the number of guided optical modes which it can support is reduced to typically approximately 5, and in this case approximately 3. Hence, LMA fiber is a quasi-single mode fiber. Also, the core is doped in a strategic pattern, in which the doping is concentrated in a small central area of the core. This is designed to greatly enhance the gain of the fundamental optical mode compared to higher order modes [13], because the fundamental mode overlaps the doped region to a greater extent than other modes. The result is a quasi-single mode output, having a good mode quality of $~M^2=1$. LMA fiber also has a raised refractive index ring within the core which significantly reduces bending losses, and further increases the size of the fundamental mode.

The LMA fiber contrasts with similarly sized typical large core fiber in that the latter has a much higher NA value (typically ~0.2) and can consequently support a higher number of modes, giving a poor quality output (high $M^2$ value). The combination of a large core area and a small number of modes means that in the LMA fiber, the amplified pulses maintain a good beam quality while having a lower intra-fiber intensity (owing to the increased core area) so that higher pulse energies can be supported without including non-linear distortion.

Furthermore, as a direct result of the high gain and tightly confined optical mode of conventional single-mode rare-earth doped fiber amplifiers, rapid energy loss in the form of amplified spontaneous emission (ASE) limits the pulse energy from these amplifiers to around 10 μJ. Using LMA fiber instead allows the maximum pulse energy to be increased, in addition to avoiding non-linear spectral distortion.

In the power amplifier, the ends 100, 102 of the LMA fiber are angled. One end 100 is a seed launch end and is angle polished. End 100 receives the input to the power amplifier 96, as indicated by the arrow in FIG. 19. The other end 102 is the pump end and is angle cleaved. A pair of lenses 104, 106 is arranged at the pump end 102 of the LMA fiber 98. A dichroic mirror 108 is positioned at an angle between the lenses 104, 106. The dichroic mirror 108 has an optical coating such that it is highly reflecting at wavelengths longer than 1 μm, and highly transmitting at wavelengths shorter than 1 μm. A further piece of optical fiber, being a coupling fiber 10, is located on the far side of the pair of lenses 104, 106, and receives light from a pump laser 112. The pump laser 112 is preferably a medium brightness diode laser producing 6 W of light at 915 nm.

In use, pulses of light having a wavelength of 1.05 μm to be amplified by the power amplifier 96 are coupled into the core of the LMA fiber 98 via the seed launch end 100, and propagate through the LMA fiber 98. At the same time, pump light is produced by the pump laser 112 and coupled into, and propagates along, the coupling fiber 110. The pump light diverges on exiting the far end of the coupling fiber 110, is collimated by the second lens 106, passes through the dichroic mirror 108 owing to the pump wavelength being in the range of high transmission of the dichroic mirror 108, and is focussed into the inner cladding of the LMA fiber 98 at the pump end 102 by the first lens 104. The pump light couples from the inner cladding into the core. The pump light hence counter-propagates in the LMA fiber 98 relative to the pulse propagation direction, and the energy of the pulses is amplified in the LMA fiber 98 in the known fashion. The amplified pulses exit the pump end 102 of the LMA fiber 98 as a divergent beam, which is collimated by the first lens 104. The pulses are reflected by the dichroic mirror 108 owing to the pulse wavelength being in the range of high reflectivity of the dichroic mirror 108, and hence leave the power amplifier as an amplified output, indicated by the arrow in FIG. 19.

In contrast to the forward pumped pre-amplifiers which are configured for low noise operation, the power amplifier 96 is arranged in a reverse pumping configuration, because this gives the maximum amount of overall gain. Gain is maximized towards the end of the fiber which receives the pump, so reverse pumping ensures that the pulses being amplified experience the greatest amount of gain after they have already been amplified in the rest of the fiber. The minimization of noise is less important in the final stage of an amplifier cascade 126, whereas it is desirable to achieve as much amplification as possible in the final stage to achieve high pulse energies.

FIG. 20 shows the refractive index profile of the preform of the LMA fiber, as a plot of the variation of refractive index RI with fiber radius r. The raised refractive index ring within the core is evident. As mentioned, this increases the fundamental mode size and significantly reduces bending losses.

FIG. 21 shows a schematic cross-section of the preform of the LMA fiber, showing that the inner cladding 114 is provided with some flat sides 116. The use of cladding pumping in the power amplifier 96 makes it desirable to maximize the absorption of pump light from the inner cladding of the LMA fiber 114 into the core. To achieve this, flat sides 116 are milled on the LMA fiber perform. This destroys the cylindrical symmetry of the fiber and encourages the conversion of spiral cladding modes which do not intercept the core, into modes having trajectories that cross the core so that they can be absorbed.

An alternative method of destroying the circular symmetry of the LMA fiber to improve pump absorption is to use a fiber in which the core is offset from the central longitudinal axis of the fiber so that it is not positioned symmetrically with respect to the inner cladding. This arrangement increases the likelihood that spiral cladding modes will intercept the core and be absorbed. Any other configuration which achieves the aim of increasing the likelihood that modes propagating in the inner cladding will cross the core and be absorbed may also be used.

The power amplifier forms the final amplifier in the cascade of amplifiers 126 shown in FIG. 1. Nonlinear processes in the final amplifier of a cascade are a limiting factor on the maximum achievable pulse energy, so the length of LMA fiber in the power amplifier 96 is desirably as short as possible, to increase the threshold power for the onset of nonlinear distortion. The strongest absorption peak of Yb is at 975 nm. Absorption at this wavelength is four times stronger than at 915 nm. Preferably, therefore, the power amplifier 96 is pumped at 975 nm as this will minimize the fiber length needed to absorb the pump light. However, the illustrated embodiment is pumped with a 915 nm pump source, which gives satisfactory results. Use of a 975 nm pump source, however, should allow pulse energies at least double those attainable with a 915nm pump source to be achieved.

The efficiency of the LMA fiber 98 was measured by constructing from it a laser with 4% cleaved end reflections.

FIG. 22 shows a plot of output signal power $P_S$ from this laser against absorbed pump power $P_P$, which indicates that the threshold power of the laser is 560 mW and the slope efficiency is 77%. This compares with a quantum efficiency of 89% for a pump wavelength of 915 nm and a signal wavelength of 1030 nm. The LMA fiber 98 is therefore suitable for amplifying high-energy pulses.

When configured as an amplifier, end reflections in the LMA fiber 98 were suppressed by angle polishing the seed launch end 100 and angle cleaving the pump end 102 of the LMA fiber 98.

FIG. 23 shows plots of the average output power $P_O$ and pulse energy E against pulse repetition rate f for a constant pump power of 3.5 W ($\leq$2.0 W launched) achieved in the power amplifier 96. The maximum pulse energy is 76 µJ.

Figure 24A:
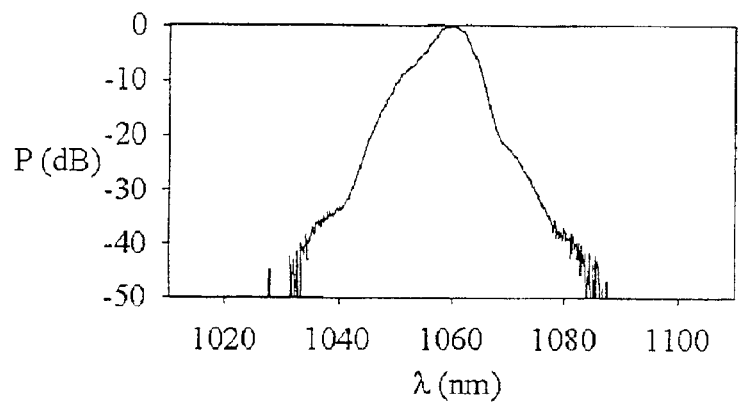
Figure 24B:
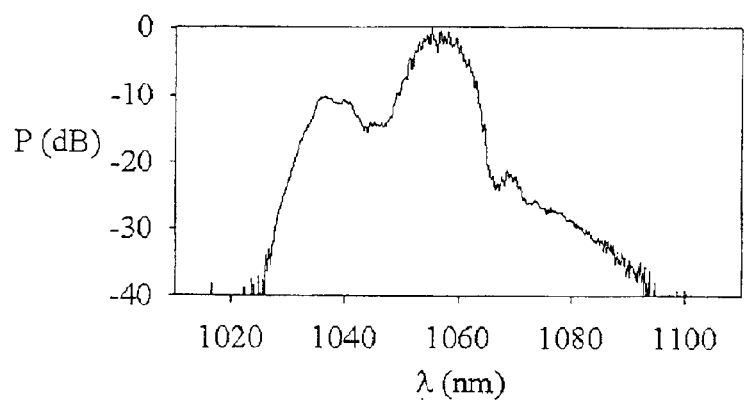
Figure 24C:
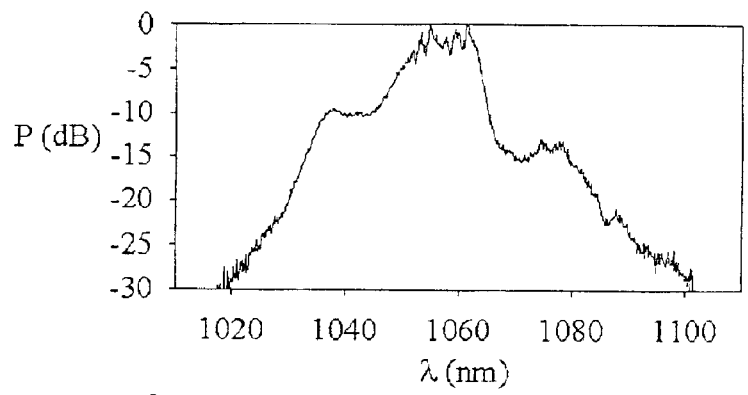
Figure 24D:
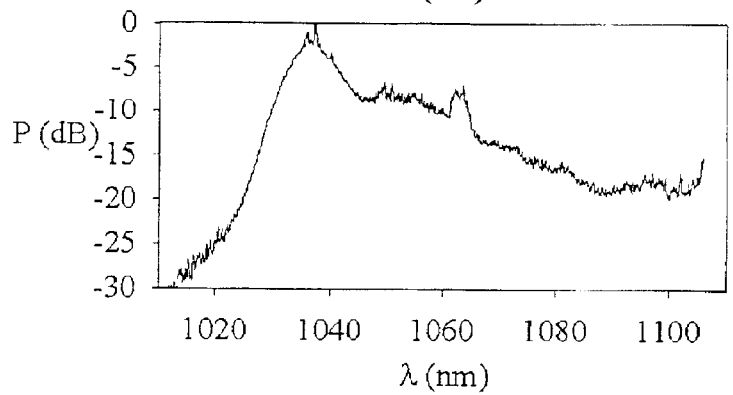

FIG. 24 shows spectra of various pulses amplified in the power amplifier 96, as variations of power P against wavelength λ. The spectra correspond to different pulse energies and repetition rates, as follows:

|  | Pulse energy | Pulse repetition frequency |
| --- | --- | --- |
| FIG. 24(a) | 34 nJ | 50 MHz |
| FIG. 24(b) | 1.6 µJ | 1 MHz |
| FIG. 24(c) | 16 µJ | 100 kHz |
| FIG. 24(d) | 76 µJ | 10 kHz |

At the highest pulse energy of 76 µJ, the spectrum shows significant distortion, which can be improved by using a shorter length of LMA fiber, and/or increasing the duration of the pulses entering the power amplifier 96, to achieve a corresponding pulse energy and still obtain ~200 fs compressed pulses. It is noted that higher pulse energies are achieved for lower pulse repetition rates.

Optical Isolation

FIGS. 2, 14 and 19 each show pump sources (16, 78, and 112 respectively) coupled directly to the oscillator or amplifier in question. In the case of the laser oscillator 10 and the pre-amplifiers, 68a and 68b, a fiber WDM is used to couple the pump light from the pump source to the laser oscillator 10 or amplifier 68.

It is preferable, however, to include an optical isolator between the pump source and the oscillator/amplifier. The function of the isolator is to transmit light at the pump wavelength in a forward direction so that the pump light can enter the oscillator/amplifier, and to block or reflect light at the signal wavelength (the wavelength generated by the laser oscillator 10 or amplified by the amplifier 68) in the reverse direction. This serves to protect the pump source from any backwardly propagating light at the signal wavelength which might damage the pump source or disturb its operation in some way if allowed to enter the pump source.

FIG. 25 shows a schematic diagram of an example pump source in the form of a fiber pigtailed high brightness laser diode 300. A bulk optical isolator 302, also fiber pigtailed, is coupled to the diode 300 by a fiber splice 304. The isolator 302 is further spliced to a WDM 308 (shown in broken lines) by a splice 306. The WDM 308 couples pump light from the diode 300 to a fiber oscillator or amplifier.

Bulk isolators provide good isolation, but have a transmission loss of typically 1 to 2 dB. Losses of this magnitude may be acceptable for some applications and types of pump sources, for example MOPAs. However, optical systems having pump sources with low power outputs, such as high-brightness diodes, may not be able to tolerate such losses. An alternative in such cases is to use one or more WDM (fused tapered) fiber couplers in place of the bulk isolator.

FIG. 26 shows a schematic diagram of a diode pump source 300 with WDM isolation. The fiber pigtailed diode 300 is spliced to a first WDM 312 by a first fiber splice 310. A second splice 314 couples the first WDM 312 to a second WDM 316, and a third splice 318 couples the second WDM 316 to a third WDM 320. A final splice 322 couples the third WDM 320 to a final WDM 308 corresponding to the WDM 308 in FIG. 25, which couples the pump light into an oscillator or amplifier.

A suitably optimized WDM provides both isolation from the signal wavelength and high transmission for the pump wavelength. In the case of the oscillator and amplifiers described above, WDMs optimized for operation at 976 nm pump and 1056 nm signal have been used. However, for a wavelength combination like this, the pump and signal wavelengths are closely spaced. Also, a broad range of signal wavelengths (of the order of 30 nm) is desirably accommodated. A WDM designed for such operation only provides approximately 15 dB of isolation, which may be insufficient to adequately protect the pump source 300. The isolation can be increased by using two, three or more WDMs coupled together in a cascade, as shown in FIG. 26. This gives a level of isolation in excess of 40 dB, which gives sufficient protection for pump sources such as high brightness laser diodes.

WDM cascades of this type have been used to isolate grating stabilized Fabry-Perot high-brightness laser diodes used as pump sources for the pre-amplifiers described above. Also, bulk isolators have been used to isolate MOPAs used to pump the pre-amplifiers.

Pulsed Light Source

FIG. 27 is a detailed drawing of the whole system comprising the components described above. The system comprises a laser oscillator 10 as shown in FIG. 2, a pulse selector 52 as shown in FIG. 13, and a cascade of fiber amplifiers comprising two pre-amplifiers 68 as shown in FIG. 14 and a power amplifier 96 as shown in FIG. 19. As each of these component parts has already been described in some detail, the following description concentrates on the light source as a whole. FIG. 27 uses reference numerals corresponding to those used in earlier Figures where appropriate.

The laser oscillator 10 has a principal laser output 44 and a secondary output 38. The secondary output 38 is incident on a fast photodiode detector 21, which has connected to it a cable 23 leading to two delay generators 25a, 25b. After the delay generators 25a, 25b, further cabling connections are provided.

A half-wave plate 48 and a lens 50 are located outside the laser oscillator 10 in the path of the principal laser output 44. The lens 50, is followed by a length of undoped single mode optical fiber 55 which leads to a pulse selector 52. The pulse selector 52 is connected to the photodiode detector 21 and a first delay generator 25a by a cabling connection 23a. The pulse selector 52 is followed by a further length of undoped single mode optical fiber 122 and a fiber coupler 124, which couples the laser oscillator 10 and the pulse selector 52 to a fiber amplifier cascade 126.

The cascade 126 includes a pulse stretcher having the form of a chirped fiber Bragg grating 128. The fiber Bragg grating 128 is coupled to a first pre-amplifier 68a via a 3 dB fiber coupler 330 and conventional fiber splices 130. The first pre-amplifier 68a includes a pump laser 28 in the form of a MOPA and terminates in an angle polished fiber end 76a.

Following the first pre-amplifier 68a is a first time-gating device 132a, comprising, in sequence, a first lens 134, a quarter-wave plate 136, a half-wave plate 138, an optical isolator 140a having the form of a Faraday rotator and two beam splitters, an acousto-optic modulator 142a, and a second lens 144. The acousto-optic modulator is connected to the photodiode detector 21 and the second delay generator 25b by a cabling connection 23b.

A second pre-amplifier 68b, having substantially the same structure as the first pre-amplifier 68a, follows the first time gating device 132a. Both ends 76b of the second pre-amplifier 68b are angle polished.

A second time-gating device 132b is located after the second pre-amplifier 68b. It has the same structure as the first time-gating device 132a described above, with its acousto-optic modulator 142b being connected to photodiode detector 21 and the second delay generator 25b by a cabling connection 23c.

The final fiber amplifier in the cascade 126 is a power amplifier 96, having angled ends to its amplification medium 98, and also including a pair of lenses 104, 106, a dichroic mirror 108 and a pump laser 112 configured for reverse pumping of the power amplifier 96.

The fiber amplifier cascade 126 terminates with a diffraction grating compressor 146, and a half-wave plate 148 located in the beam path entering the compressor 146. The compressor 146 comprises a pair of bulk diffraction gratings. The exit beam path of the compressor 146 represents the final output 150 of the light source 120.

In use, the laser oscillator 10 generates a train of ultrashort pulses having a repetition rate of the order of 54 MHz, and pulse energies of 30 pJ. Part of the pulse train forms the secondary laser output 38, and is detected by the photodiode detector 21. The photodiode detector 21 generates an electronic signal indicative of the repetition rate of the pulses, which passes along the cable 23 to the delay generators 25a, 25b. The delay generators 25a, 25b introduce delays to the repetition rate of the electronic signal, so that the repetition rate of the electronic signals output by the delay generators 25a, 25b is effectively reduced. The delays and hence the reduced repetition rate can be varied, and can be as low as 10 kHz. These delayed signals form drive or trigger signals which are passed via cabling to the pulse selector 52 and the acousto-optic modulators 142a, 142b. Both delay generators operate in the manner described previously.

A further part of the pulse train forms the principal laser output 44. The pulses, at the 54 MHz repetition rate, pass from the oscillator 10 through the half-wave plate 48 and the lens 50. The lens 50 focuses the pulses into the fiber coupler 54 so that the pulses propagate through the undoped fiber 55 to the pulse selector 52, which is being triggered by the 10 kHz drive signal from the first delay generator 25a. Accordingly, pulses can only pass through the pulse selector 52 when it receives a trigger from the trigger signal, so that the repetition rate of the pulses is reduced to 10 kHz. This reduction in repetition rate reduces the average power of the train of pulses, to address the problem of saturation of amplifier gain which occurs at high powers.

The reduced repetition rate pulses leave the pulse selector 52 and pass along the second length of undoped fiber 122 to the pulse stretcher 128. The pulse stretcher 128 acts in the conventional manner to increase the duration of the pulses while maintaining their energy, consequently reducing the pulse peak power. This reduction in power allows the pulses to propagate through the amplifier cascade 126 at powers below the threshold for nonlinear optical effects in the amplification media, so that distortion of the pulses by nonlinearities is reduced.

The stretched pulses propagate through the first pre-amplifier 68a, where they are amplified by a 25 dB gain, and to the first time gating device 132, where they are collimated by the lens 134. The optical isolator 140 a is arranged for forward pass only, so it transmits the pulses after they have been appropriately polarized by the wave plates 136, 138 to give maximum throughput through the isolator 140a. The pulses then reach the acousto-optic modulator 142a, which is driven by the drive signal from the second delay generator 25b. Therefore, the acousto-optic modulator 142a is triggered to transmit light in synchronism with the propagating pulses. After passing through the acousto-optic modulator 142a the pulses are focussed by the lens 144 into the second pre-amplifier 68b.

The second pre-amplifier 68b amplifies the pulses by a gain of 27 dB, which then pass to the second time-gating device 132b, the acousto-optic modulator 142b of which is also driven by the drive signal from the second delay generator 25b. The second time-gating device 132b operates in the same way as the first time-gating device 132a.

The pulses then propagate through the amplification medium 98 of the power amplifier 96, where they are further amplified by a gain of 30 dB, before leaving the power amplifier 96 by reflection from the dichroic mirror 108. The polarization of the pulses is adjusted by the half-wave plate 148 before the pulses enter the grating compressor 146. The compressor 146 acts in the conventional way to compress the pulses by reducing their duration; this has the effect of increasing the peak power of the pulses while maintaining the pulse energy levels achieved by the amplification The purpose of the time-gating devices, 132a and 132b, will now be described. It is well known that fiber amplifiers produce amplified spontaneous emission (ASE) in addition to amplifying light. In cascaded laser amplifiers it is desirable to prevent the (ASE) build-up from saturating the amplifiers if a large gain is required [6]. An isolator addresses the problem of backwardly propagating ASE, by only allowing propagation of light in the forward direction. The acousto-optic modulators provide a further improvement. Each acousto-optic modulator is triggered in phase with, and at the repetition rate of, the pulses to provide a "transmission window" having a width wide enough to transmit a laser pulse. In this way, the acousto-optic modulator is only operable to transmit light at times when a pulse is present, thus preventing propagation of ASE at times between pulses.

Overall, the pulses leave the laser oscillator with energies of 50 pJ and a repetition rate of 54 MHz, and leave the light source as a whole, after pulse selection and amplification, with energies of 76 µJ and a repetition rate of 10 kHz. The net gain of the source results from the gain of the various amplifiers, reduced by the loss of various other components of the source:

TABLE 2

| Component | Gain(dB) |
|---|---|
| Fiber coupler 54 | −3 |
| Pulse selector 52 | −5 |
| Pulse stretcher 128 | −10 |
| First pre-amplifier 68a | +25 |
| First time-gating device 132a | −3 |
| Second pre-amplifier 68b | +27 |
| Second time-gating device 132b | −3 |
| Power amplifier | +30 |
| Net gain | +58 |

FIG. 28 shows the results (as plots of power P against time t) of a numerical simulation of pulses from a light source, showing how the nonlinear distortion in the power amplifier leads to an increase in the duration of the compressed pulses. Plots 118, 121, 123 and 125 are for pulse energies of 1, 10, 20 and 40 µJ respectively, and illustrate how the pulse width increases from 150 fs to 350 fs with increasing pulse energy. Higher energy leads to increased nonlinear distortion: The parameters used in the simulation were a 300 µm$^2$ core area for the LMA fiber, for a 3.5 m length of fiber. The assumed gains and losses of the rest of the system were as given in Table 2, and each pre-amplifier was assumed to be 4 m long. The duration of the pulses at the start of the amplifier cascade was assumed to be 130 fs. In reality, the pulses from the laser-oscillator have a duration of ~1.5 ps, but the required additional stretching is accounted for because the simulation assumes 4 m of undoped fiber for the pulse selector, whereas, in practice the length of fiber attached to the pulse selector is ~2 m.

The embodiment shown in FIG. 27 incorporates an amplifier cascade 126 suitable for chirped pulse amplification (CPA). CPA is a technique traditionally applied to bulk laser systems in which a short transform-limited optical pulse is first chirped in a pulse stretcher to greatly increase its duration, then amplified to a high energy before being recompressed back to its initial duration at the system output by a pulse compressor having opposite dispersion to the pulse stretcher. In this manner low peak powers are maintained, avoiding the limiting effects of nonlinearity within the amplifier(s), thus increasing the peak powers that are attainable.

Pulse stretching and compressing are usually performed with bulk optic devices such as a diffraction grating pair [14, 15]. However, obtaining the required temporal stretching factors can require grating separations of the order of 1 m, making such systems large. In contrast, chirped fiber Bragg gratings (FBGs) are highly dispersive and can provide suitable time delays in only centimeter lengths of fiber [16]. The principal limit on the use of FBGs is that they are intrinsically nonlinear, and at high powers this nonlinearity degrades pulse quality. Therefore the embodiment of the present invention uses a chirped FBG pulse stretcher, and a bulk-grating compressor, as shown in FIG. 27. However, chirped FBGs can be used for both stretching and compression, as can bulk grating compressors. Also, the pulse stretcher may be coupled to the amplifier cascade by means of, for example, a 50/50(3 dB) fiber coupler, or by a Faraday rotator-based optical circulator which typically has lower loss than a 50/50coupler.

Use of chirped pulse amplification in the pulsed light source 120 described herein can produce very high energy pulses, up to between about 100 µJ and 1 mJ.

Parabolic Pulse Amplification

If pulse energies up to about 1 µJ, and possibly up to 10 µJ are adequate for a given application, then it is possible to utilize the technique of parabolic pulse amplification instead of chirped pulse amplification. Although parabolic pulse amplification gives lower pulse energies (which are nonetheless high enough for many applications), it is simpler to implement than chirped pulse amplification, so may be preferable for some applications.

FIG. 29 shows a further embodiment of a pulsed light source 120, which can be used to achieve the parabolic pulse amplification. This technique does not require the use of a pulse stretcher prior to amplification of the pulses, although a pulse compressor after the amplifier or amplifier cascade is required. Consequently, the features shown in FIG. 29 are the same as those shown in FIG. 27 with the exception of the pulse stretcher, which is not included.

Parabolic pulses are a class of solution to the non-linear Schroedinger equation (NLSE) with gain, which describes the propagation of light in optical fibers amplifiers. It has recently been found [17] that self-similarity techniques applied to non-linear optics lead to an exact asymptotic solution of the NLSE with gain, and that the solution is a parabolic pulse with strictly linear chirp. These asymptotic self-similar parabolic pulses are of fundamental interest since their linear chirp (maintained because the SPM adds quadratic phase) facilitates efficient pulse compression. The asymptotic pulse characteristics are determined only by the incident pulse energy and the amplifier parameters, with the initial pulse shape determining only the map toward this asymptotic solution. This behavior contrasts with that of the better known soliton solutions, which require accurate control of the input pulse energy and where a given input pulse develops into a continuum. In parabolic amplifiers all of the incident pulse energy contributes to the output parabolic pulse. Amplification of parabolic pulses in fiber amplifiers therefore has potentially wide application for optical technology, allowing the generation of well-defined linearly chirped output pulses from an optical amplifier, even in the presence of input pulse distortions.

In practice, the pulses entering the amplifier cascade 126 are allowed to broaden in time merely by the dispersive effect of the fibers through which the pulses are propagating. This gives much less broadening than a pulse stretcher, so that the peak power is still relatively large. Consequently, it is not desirable to amplify the pulses too greatly in the cascade 126, because peak powers high enough to suffer unwanted nonlinear distortion may result. Hence, the pulse energies available from parabolic pulse amplification are less than from chirped pulse amplification. However, the linear chirp resulting from the dispersive broadening can be satisfactorily removed by simple compression in a grating pair, giving pulses of good spectral quality.

Previously published instances of parabolic pulse amplifiers include a Yb$^{3+}$-doped fiber parabolic pulse amplifier incorporated in a commercial femtosecond pulse laser product [7]. The maximum pulse energy achieved in the prior art is 12 µJ. Use of a pulsed light source 120 according to embodiments of the present invention for parabolic pulse amplification allows generation of parabolic pulses having energies at least an order of magnitude higher than this.

For parabolic pulse amplification, the diffraction grating pair compressor has a fixed grating separation. Operation can be achieved by adjusting the gain to minimize the autocorrelation FWHM of the pulses (i.e. match the slope of the pulse chirp). When the gain is reduced below optimum the autocorrelation has a smooth and broad peak, and it becomes a sharp spike on a broad pedestal when the gain is above optimum.

FIG. 30 shows a spectrum of the parabolic pulses after the second pre-amplifier, as a plot of intensity I against wavelength λ. The very distinctive "Batman" spectrum shows parabolic shape in the center.

FIG. 31 shows a spectrum of the pulses after the power amplifier, as a plot of intensity I against wavelength λ. Both this spectrum and the spectrum in FIG. 30 have been confirmed by numerical simulation.

FIG. 32 shows the autocorrelation (variation of second harmonic intensity I with delay t) of the pulses after compression. The pedestal-free shape of the autocorrelation is evidence of the linear chirp of the pulses before compression.

FIG. 33 shows the result of a numerical simulation of the shape of the pulses (as a plot of power P against time t), illustrating the distinctive parabolic pulse shape.

Table 3 shows the results of parabolic pulse amplification achieved by using the embodiment of the present invention. As expected, for the shortest pulses using a given compressor grating separation the pulse energy is maximized when more of the gain is in the power amplifier and less in the pre-amplifiers. Less obviously, the pulse energy is greater for a smaller grating separation, which implies that the slope of the chirp decreases with increasing pulse energy. Both of these results have been confirmed by numerical simulations.

TABLE 3

| Grating Separation (cm) | $I_{preamp2}$ (mA) | $I_{LMA}$ (A) | Duty cycle (%) | Δλ (nm) after preamp2 | Δλ (nm) after LMA | Auto-corre-lation Δτ (μs) | Av. Power (LMA) (W) |
|---|---|---|---|---|---|---|---|
| 13.5 | 989 | 1.53 | 37 | 10.6 | 9.5 | 11.6 | 0.88 |
| 11.9 | 989 | 1.53 | 16 | 12.5 | 10.6 | 11.6 | 0.88 |
| 11.9 | 1100 | 1.53 | 22 | 12.7 | 10.6 | 11.2 | 0.92 |
| 11.9 | 1500 | 1.53 | 48 | 12.6 | 11.9 | 11.2 | 0.95 |
| 11.9 | 989 | 1.8 | 16 | 12.2 | 8.5 | 11.8 | 1.15 |
| 11.9 | 989 | 1.1 | 11 | 12.8 | 12.1 | 13.2 | 0.4 |
| 11.9 | 989 | 1.53 | 8 | 12.2 | 10.5 | 11.8 | 0.864 |

Thus, this embodiment can achieve amplification of parabolic pulses to an energy an order of magnitude higher than has previously been published.

Further Embodiment

Both the pulse stretcher and the pulse compressor can be omitted from the configuration of FIG. 27. This permits straightforward amplification of the pulse energy, although the quality of the amplified pulses may be poor.

References

[1] Cautaerts, V., et al, "Stretched pulse $Yb^{3+}$:silica fiber laser" *Optics Letters*, 1997. 22(5): p. 316–318.
[2] Galvanauskas, A., et al., "Millijoule femtosecond fiber CPA system" *Paper PD3-1, Conference on Lasers and Electro-Optics Technical Digest* 2000, Optical Society of America.
[3] Fermann, M. E., et al., "Wavelength-tunable soliton generation in the 1400–1600 nm region using an Yb fiber laser" *Paper TU12-1, Conference on Lasers and Electro Optics Technical Digest* 2000, Optical Society of America.
[4] Paschotta, R., et al., "Ytterbium-doped fiber amplifiers" *IEEE Journal of Quantum Electronics*, 1997. 33(7): p. 1049–1056.
[5] Pask, H. M., et al., "Ytterbium-Doped Silica Fiber Lasers—Versatile Sources for the 1–1.2Mu-M Region" *IEEE Journal of Selected Topics in Quantum Electronics*, 1995. 1(1): p. 2–13.
[6] Desthieux, B., R. I. Laming, and D. N. Payne, "111 kW (0.5 mJ) Pulse Amplification at 1.–5-Mu-M Using a Gated Cascade of three Erbium-Doped Fiber Amplifiers" *Applied Physics Letters*, 1993. 63(5): p. 586–588.
[7] Fermann, M. E., et al., "Ultrawide tunable Er soliton fiber laser amplified in Yb-doped fiber" *Optics Letters*, 1999. 24(20): p. 1428–1430.
[8] Ober, M. H., M. Hofer, and M. E. Fermann, "42-Fs Pulse Generation from a Mode-Locked Fiber Laser Started with a Moving Mirror" *Optics Letters*, 1993. 18(5): p.367–369.
[9] Keller, U., et al., "Semiconductor saturable absorber mirrors (SESAM's) for femtosecond to nanosecond pulse generation in solid-state lasers" *IEEE Journal of Selected Topics in Quantum Electronics*, 1996. 2(3): p. 435–453.
[10] Monro, T. M., et al., "Holey optical fibers: An efficient modal model" *Journal of Lightwave Technology*, 1999. 17(6): p. 1093–1102.
[10] Honninger, C., et al., "Efficient and tunable diode-pumped femtosecond Yb glass lasers" *Optics Letters*, 1998.23(2): p. 126–128.
[12] Lee, J., et al., "Enhancement of power conversion efficiency for an L-band EDFA with a secondary pumping effect in the unpumped EDF section" *IEEE Photonics Technology Letters*, 1999. 11(1): p. 42–44.
[13] Broderick, N. G. R., et al., "Power scaling in passively mode-locked large-mode area fiber lasers" *IEEE Photonics Technology Letters*, 1998. 10(12): p. 1718–1720.
[14] Lemoff B. E. and C. P. J Barty, "Quintic-phase-limited, spatially uniform expansion and recompression of ultrashort optical pulses" *Optics Letters*, 1993.18(19): p. 1651–1653.
[15] Martinez O. E., "Design of high-power ultrashort pulse-amplifiers by expansion and recompression" *IEEE Journal of Quantum Electronics*, 1987. QE-23 (8): p. 1385–1387.
[16] Broderick, N. G. R. et al., "High-power chirped-pulse all-fiber amplification system based on large-mode-area fiber gratings" *Optics Letters*, 1999. 24(8): p. 566–568.
[17] Fermann, M. E., et al., "Self-similar propagation and amplification of parabolic pulses in optical fibers" *Physical Review Letters*, 2000. 84(26): p. 6010–6013.

We claim:

1. A source of pulses of coherent radiation at a wavelength of approximately 1 μm, comprising:

a laser oscillator system operable to generate laser pulses at a defined repetition rate; and a cascade of sequentially arranged optical amplifiers arranged to receive and amplify the laser pulses, each optical amplifier comprising an amplifier pump source for producing amplifier pump light and an amplification medium comprising $Yb^{3+}$-doped optical fiber having a cladding and a core and arranged to receive the amplifier pump light and the laser pulses, the cascade comprising a first pre-amplifier followed by a second pre-amplifier followed by a power amplifier, the amplification media of the pre-amplifiers comprising single mode optical fibers arranged to receive amplifier pump light into the core of the optical fibers, each pre-amplifier further comprising a $Yb^{3+}$-doped indirectly pumped optical fiber coupled to the optical fiber of its amplification medium to absorb amplified spontaneous emission arising from the amplification medium, and arranged so that it does not receive amplifier pump light, and the amplification medium of the power amplifier comprising a large mode area optical fiber having an inner cladding and arranged to receive amplifier pump light into the inner cladding.

2. The source of pulses of coherent radiation according to claim 1, in which the amplifier pump source of each pre-amplifier comprises one of:
 a master-oscillator-power-amplifier system (MOPA);
 a high-brightness single mode diode laser; or
 an optical fiber-based laser.

3. The source of pulses of coherent radiation according to claim 1, in which the amplifier pump source of the power amplifier comprises a diode laser.

4. The source of pulses of coherent radiation according to claim 1, in which the pulses have an optical mode quality of substantially $M^2=1$ after amplification in the cascade.

5. The source of pulses of coherent radiation according to claim 1, and further comprising a pulse detector arranged to generate a pulse selection signal indicative of the repetition rate, and at least one time gating device that is responsive to the pulse selection signal and arranged to allow radiation to pass from one optical amplifier to another in synchronicity with the pulse selection signal.

6. The source of pulses of coherent radiation according to claim 1, in which each optical amplifier further comprises an optical isolating device associated with the amplifier pump source and operable to protect the amplifier pump source from exposure to radiation generated in or reflected from other parts of the source of coherent radiation.

7. The source of pulses of optical radiation according to claim 6, in which the or each optical isolating device comprises one or more wavelength division multiplexers configured to reflect radiation having a wavelength of approximately 1 μm.

8. The source of pulses of coherent radiation according to claim 1, and further comprising a pulse compressor which decreases the duration of the amplified pulses, the cascade of optical amplifiers being arranged to achieve parabolic pulse amplification.

9. The source of pulses of coherent radiation according to claim 8, in which the pulse compressor comprises a pair of diffraction gratings.

10. The source of pulses of coherent radiation according to claim 1, in which the large mode area optical fiber of the power amplifier is provided with an asymmetry in cross-section to enhance coupling of the amplifier pump light received into the inner cladding from the inner cladding to the core.

11. The source of pulses of coherent radiation according to claim 10, in which the asymmetry arises from one or more generally flat sides provided on an outer surface of the inner cladding.

12. The source of pulses of coherent radiation according to claim 10, in which the asymmetry arises from the core being axially offset from a central axis of the inner cladding.

13. The source of pulses of coherent radiation according to claim 1, and further comprising a pulse stretcher which increases the duration of the pulses before passing them to the cascade of optical amplifiers, and a pulse compressor which decreases the duration of the amplified pulses, the cascade of optical amplifiers being arranged to achieve chirped pulse amplification.

14. The source of pulses of coherent radiation according to claim 13, in which the pulse stretcher comprises a chirped fiber Bragg grating.

15. The source of pulses of coherent radiation according to claim 13, in which the pulse compressor comprises a pair of diffraction gratings.

16. A source of pulses of coherent radiation at a wavelength of approximately 1 μm, comprising:
 means for generating laser pulses at a defined repetition rate; and
 a cascade of sequentially arranged optical amplifiers arranged to receive and amplify the laser pulses, each optical amplifier comprising an amplifier pump source for producing amplifier pump light and an amplification medium comprising $Yb^{3+}$-doped optical fiber having a cladding and a core and arranged to receive the amplifier pump light and the laser pulses,
 the cascade comprising a first pre-amplifier followed by a second pre-amplifier followed by a power amplifier,
 the amplification media of the pre-amplifiers comprising single mode optical fibers arranged to receive amplifier pump light into the core of the optical fibers, each pre-amplifier further comprising a $Yb^{3+}$-doped indirectly pumped optical fiber coupled to the optical fiber of its amplification medium to absorb amplified spontaneous emission arising from the amplification medium, and arranged so that it does not receive amplifier pump light, and
 the amplification medium of the power amplifier comprising a large mode area optical fiber having an inner cladding and arranged to receive pump light into the inner cladding.

17. A source of pulses of coherent radiation at a wavelength of approximately 1 μm, comprising:
 a pump source for producing pump light;
 a laser cavity comprising an $Yb^{3+}$-doped gain medium arranged to receive the pump light, the laser cavity being modelocked to generate laser pulses at a defined repetition rate;
 a pulse detector arranged to generate a pulse selection signal indicative of the repetition rate;
 a pulse selector arranged to reduce the repetition rate of the laser pulses responsive to the pulse selection signal from the pulse detector by passing only selected ones of the laser pulses; and
 an optical amplifier for amplifying the laser pulses of reduced repetition rate, said optical amplifier, said optical amplifier comprising,
 an amplifier pump source for producing amplifier pump light; and an amplification medium comprising an optical fiber having a cladding and a core, the amplification medium being arranged to receive the amplifier pump light and the laser pulses and wherein said amplifier is arranged sequentially in a cascade comprising a first pre-amplifier followed by a second pre-amplifier followed by a power amplifier.

18. The source of pulses of coherent radiation according to claim 17, in which the amplification media of the first pre-amplifier and the second pre-amplifier comprise $Yb^{3+}$-doped optical fiber.

19. The source of pulses of coherent radiation according to claim 17, in which the amplification media of the first pre-amplifier and the second pre-amplifier are comprise respective sections of single mode optical fibers.

20. The source of pulses of coherent radiation according to claim 17, in which the optical fibers of the amplification media of the first pre-amplifier and the second pre-amplifier are arranged to receive amplifier pump into the cores of the optical fibers.

21. The source of pulses of coherent radiation according to claim 17, in which each pre-amplifier further comprises a $Yb^{3+}$-doped indirectly pumped optical fiber coupled to the optical fiber of its amplification medium to absorb amplified spontaneous emission arising from the amplification medium, and arranged so that it does not receive amplifier pump light.

22. The source of pulses of coherent radiation according to claim 17, in which the amplifier pump source of each pre-amplifier comprises one of:

a master-oscillator-power-amplifier system (MOPA);

a high-brightness single mode diode laser; or an optical fiber-based laser.

23. The source of pulses of coherent radiation according to claim 17, in which the amplification medium of the power amplifier comprises a $Yb^{3+}$-doped large mode area optical fiber having a core and an inner cladding.

24. The source of pulses of coherent radiation according to claim 23, in which the amplifier pump source of the power amplifier comprises a diode laser.

25. The source of pulses of coherent radiation according to claim 23, in which the pulses have an optical mode quality of substantially $M^2 1$ after amplification in the power amplifier.

26. The source of pulses of coherent radiation according to claim 23, in which the large mode area fiber of the power amplifier is arranged to receive amplifier pump light into its inner cladding.

27. The source of pulses of coherent radiation according to claim 26, in which the large mode area optical fiber of the power amplifier is provided with an asymmetry in cross-section which acts to enhance coupling of the amplifier pump light received into the inner cladding from the inner cladding to the core.

28. The source of pulses of coherent radiation according to claim 27, in which the asymmetry arises from one or more generally flat sides provided on an outer surface of the inner cladding.

29. The source of pulses of coherent radiation according to claim 27, in which the asymmetry arises from the core being axially offset from a central longitudinal axis of the inner cladding.

* * * * *